United States Patent
Itaya

(10) Patent No.: US 11,151,666 B2
(45) Date of Patent: Oct. 19, 2021

(54) POWER GENERATION AMOUNT ESTIMATION APPARATUS, DISTRIBUTION GRID SYSTEM, AND POWER GENERATION AMOUNT ESTIMATION METHOD

(71) Applicant: Mitsubishi Electric Corporation, Tokyo (JP)

(72) Inventor: Nobuhiko Itaya, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 38 days.

(21) Appl. No.: 16/302,482

(22) PCT Filed: May 24, 2016

(86) PCT No.: PCT/JP2016/065346
§ 371 (c)(1),
(2) Date: Nov. 16, 2018

(87) PCT Pub. No.: WO2017/203610
PCT Pub. Date: Nov. 30, 2017

(65) Prior Publication Data
US 2019/0213693 A1    Jul. 11, 2019

(51) Int. Cl.
*G06Q 50/06*    (2012.01)
*H02J 3/38*    (2006.01)
(Continued)

(52) U.S. Cl.
CPC .............. *G06Q 50/06* (2013.01); *G06Q 10/04* (2013.01); *H02J 3/00* (2013.01); *H02J 3/38* (2013.01);
(Continued)

(58) Field of Classification Search
CPC . G06Q 50/06; G06Q 10/04; H02J 3/00; H02J 3/38; H02J 13/00; H02J 3/383;
(Continued)

(56) References Cited

U.S. PATENT DOCUMENTS

2009/0088991 A1*  4/2009  Brzezowski ........... G06Q 50/06
                                                              702/62
2014/0136131 A1*  5/2014  Fujimori ................. H02S 50/10
                                                              702/60
(Continued)

FOREIGN PATENT DOCUMENTS

JP    2013121010 A    6/2013
JP    2013183201 A    9/2013
JP    2015007911 A    1/2015

OTHER PUBLICATIONS

International Search Report (PCT/ISA/210) dated Jul. 26, 2016, by the Japan Patent Office as the International Searching Authority for International Application No. PCT/JP2016/065346.
(Continued)

*Primary Examiner* — Jigneshkumar C Patel
(74) *Attorney, Agent, or Firm* — Buchanan Ingersoll & Rooney PC

(57) ABSTRACT

A distribution grid management apparatus that is a power generation amount estimation apparatus includes a communication unit to acquire a solar radiation amount that is a measurement value measured by a solar radiation meter at an interval shorter than a data collection interval that is an interval at which a measurement value from a smart meter that measures the amount of electric power is collected; and a power generation amount calculation unit to estimate, on the basis of the solar radiation amount, the power generation amount of each of a plurality of photovoltaic facilities connected to a distribution line of a high-voltage grid.

11 Claims, 13 Drawing Sheets

(51) Int. Cl.
*H02J 13/00* (2006.01)
*H02J 3/00* (2006.01)
*G06Q 10/04* (2012.01)

(52) U.S. Cl.
CPC ............... *H02J 13/00* (2013.01); *Y02E 10/56* (2013.01); *Y02E 40/70* (2013.01); *Y04S 10/12* (2013.01); *Y04S 10/123* (2013.01)

(58) Field of Classification Search
CPC ..... Y02E 10/563; Y02E 40/72; Y04S 10/123; Y04S 10/12
USPC ........................................................ 700/291
See application file for complete search history.

(56) References Cited

U.S. PATENT DOCUMENTS

| | | | | |
|---|---|---|---|---|
| 2014/0252855 A1* | 9/2014 | Watanabe | ................. | H02J 3/00 307/31 |
| 2014/0278163 A1* | 9/2014 | Tan | ...................... | G01R 21/133 702/60 |
| 2015/0006080 A1* | 1/2015 | Yamazaki | ............... | G01W 1/10 702/3 |
| 2016/0006248 A1* | 1/2016 | Sakuma | .................... | H02J 3/46 307/48 |

OTHER PUBLICATIONS

Written Opinion (PCT/ISA/237) dated Jul. 26, 2016, by the Japan Patent Office as the International Searching Authority for International Application No. PCT/JP2016/065346.

* cited by examiner

FIG.7

| SM NUMBER |
| --- |
| POWER CONSUMPTION AMOUNT |
| POWER GENERATION AMOUNT |

FIG.8

| SM NUMBER |
| --- |
| SOLAR RADIATION AMOUNT |

| SM NUMBER | CUSTOMER NUMBER | PV CONTRACT TYPE | SM TYPE | ... |
|---|---|---|---|---|
| M1 | 1 | TOTAL PURCHASE | UPWARD MEASUREMENT | |
| M2 | 1 | TOTAL PURCHASE | DOWNWARD MEASUREMENT | |
| M3 | 2 | SURPLUS PURCHASE | UPWARD AND DOWNWARD MEASUREMENT | |
| ⋮ | ⋮ | ⋮ | ⋮ | |

FIG.15

| SM NUMBER | LATITUDE, LONGITUDE | PV PANEL CAPACITY | ... |
|---|---|---|---|
| M1 | X1, Y1 | P1 | |
| M2 | X2, Y2 | P2 | |
| M3 | X3, Y3 | P3 | |
| ⋮ | ⋮ | ⋮ | |

FIG.16

| SM NUMBER | LATITUDE, LONGITUDE | ... |
|---|---|---|
| M10 | A1, A2 | |
| ⋮ | ⋮ | |

FIG.20

| SOLAR RADIATION METER | RELIABILITY FLAG | CORRECTION COEFFICIENT |
|---|---|---|
| M10 | 1 | $C_1$ |
| M11 | 0 | $C_2$ |
| ⋮ | ⋮ | ⋮ |

FIG.21

ACQUIRE MEASUREMENT VALUES — S21

CORRECT MEASUREMENT VALUES FROM SOLAR RADIATION METERS — S22

CALCULATE LOAD/POWER GENERATION AMOUNT — S23

DETERMINE OPTIMUM VOLTAGE DISTRIBUTION — S24

DETERMINE VOLTAGE CONTROL AMOUNT — S25

POWER GENERATION AMOUNT ESTIMATION APPARATUS, DISTRIBUTION GRID SYSTEM, AND POWER GENERATION AMOUNT ESTIMATION METHOD

FIELD

The present invention relates to a power generation amount estimation apparatus that estimates the power generation amount of a power generation facility connected to a distribution grid, a distribution grid system, and a power generation amount estimation method.

BACKGROUND

A distribution grid generally includes a high-voltage grid and a low-voltage grid, and general-consumer power receiving terminals are connected to the low-voltage grid. Electric utilities are obliged to maintain the voltages of general-consumer power receiving terminals within an appropriate voltage range. As an example, in a case where power at 100 V is received, the electric utilities are obliged to maintain the voltage between 95 V and 107 V. For this reason, the electric utilities adjust the control amount of each voltage control device connected to the high-voltage grid in order to maintain the voltage at each general-consumer power receiving terminal. In the following description, the distribution grid shall refer to a high-voltage grid unless otherwise specified.

In recent years, photovoltaic systems of varying sizes, such as residential photovoltaic facilities and mega-solar power plants, have been connected to distribution grids, and therefore knowing the photovoltaic power generation amounts for each distribution line or distribution section is becoming necessary for grid operations.

Furthermore, conventional meter reading apparatuses are being replaced by smart meters. Patent Literature 1 discloses a technique in which a measurement-side wireless device that measures the amount of electric power transmits the measurement results from a solar radiation meter and the like together with the amount of electric power via a wireless communication network.

CITATION LIST

Patent Literature

Patent Literature 1: Japanese Patent Application Laid-open No. 2015-007911

SUMMARY

Technical Problem

However, the technique described in the above-mentioned Patent Literature 1 is for managing whether the amount of electric power of a photovoltaic facility is appropriate in accordance with the measurement results from a solar radiation meter and the like, and there is no disclosure of estimation of the power generation amount of the entire distribution grid.

In order to avoid deviation from the appropriate voltage range of the voltage of a distribution grid due to a sudden change in the power generation amount in the distribution grid, which is due to a sudden change in the weather, it is preferable for a device that controls the voltage of the distribution grid to be able to acquire the measurement value from a solar radiation meter or the measurement value of the power generation amount in as near real time as possible. However, even if the measurement value from the solar radiation meter and the power generation amount are acquired using a smart meter network employing the technique described in the above-mentioned Patent Literature 1, the data collection interval at which the measurement values are collected from the smart meter is 30 minutes, i.e., the shortest delay that occurs is 30 minutes, and therefore it is difficult to estimate the power generation amount with high accuracy. In order to suppress the deviation from the appropriate voltage range even when the weather suddenly changes, it is preferable that the calculation accuracy of the power generation amount be high.

The present invention has been made in view of the above, and an object thereof is to obtain a power generation amount estimation apparatus capable of highly accurately estimating the power generation amount of a power generation facility connected to a distribution grid.

Solution to Problem

In order to solve the above-described problems and to achieve the object, the power generation amount estimation apparatus according to an aspect of the present invention includes an acquisition unit to acquire a solar radiation amount that is a measurement value measured by a solar radiation meter at an interval shorter than a data collection interval that is an interval at which a measurement value from a smart meter that measures an amount of electric power is collected. Moreover, the power generation amount estimation apparatus according to an aspect of the present invention includes a power generation amount calculation unit to estimate, on a basis of the solar radiation amount, a power generation amount of each of a plurality of photovoltaic facilities connected to a distribution line of a high-voltage grid.

Advantageous Effects of Invention

According to the present invention, it is possible to estimate a power generation amount of a power generation facility connected to a distribution grid with high accuracy.

BRIEF DESCRIPTION OF DRAWINGS

FIG. 7 is a diagram illustrating an example of measurement data transmitted by smart meters of the embodiment.

FIG. 8 is a diagram illustrating an example of measurement data transmitted by measurement devices of the embodiment.

FIG. 15 is a diagram illustrating an example configuration of photovoltaic facility data of the embodiment.

FIG. 16 is a diagram illustrating an example configuration of solar radiation meter position data of the embodiment.

FIG. 20 is a diagram illustrating an example of correction data calculated by the correction amount calculation unit.

FIG. 21 is a flowchart illustrating an example of a voltage control procedure of the embodiment.

DESCRIPTION OF EMBODIMENTS

Hereinafter, a power generation amount estimation apparatus, a distribution grid system, and a power generation amount estimation method according to an embodiment of the present invention will be described in detail with reference to the drawings. The invention is not limited to the embodiment.

First Embodiment

Figure 1:
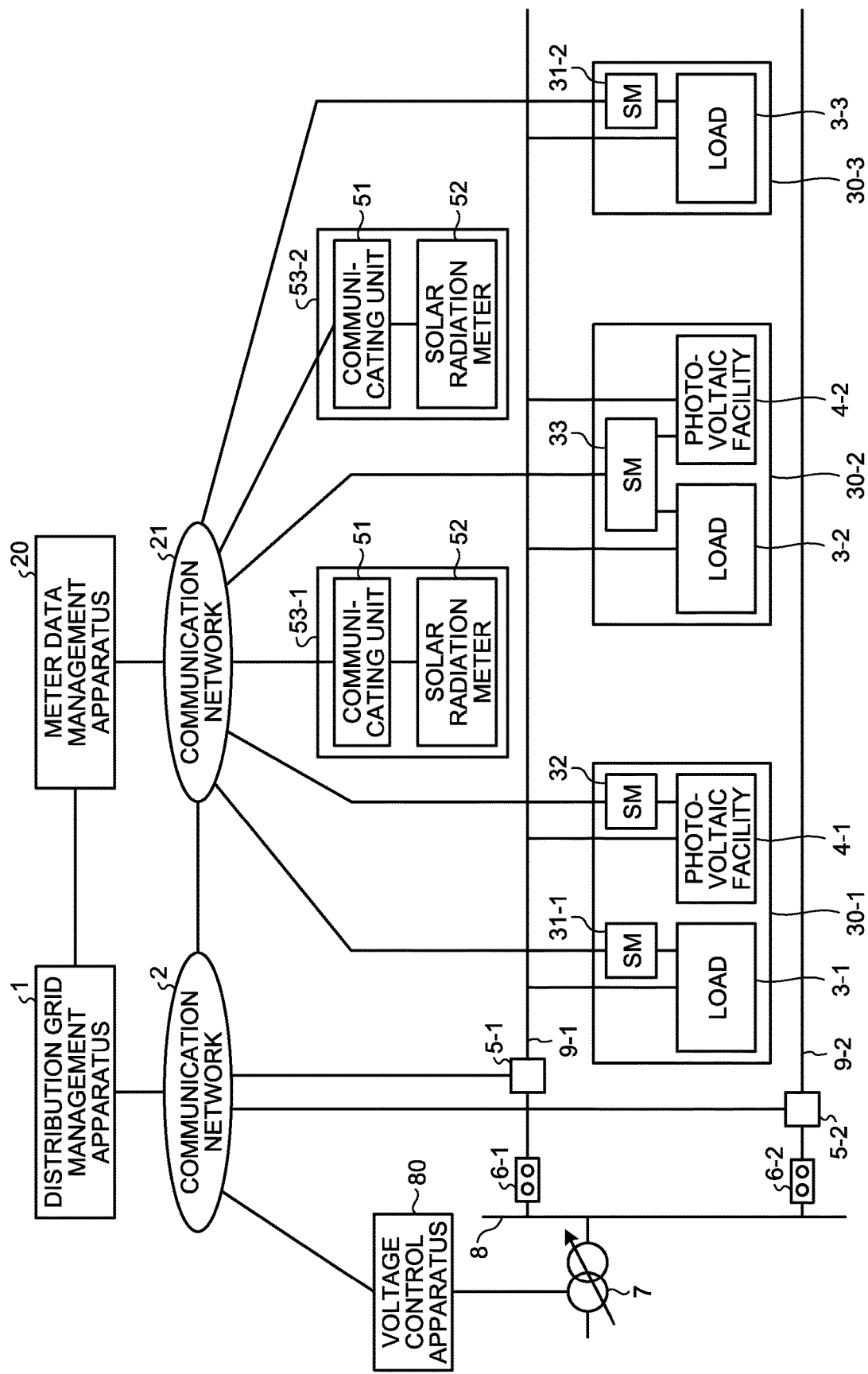
FIG. 1 is a diagram illustrating an example of a distribution grid system of an embodiment.

FIG. 1 is a diagram illustrating an example of a distribution grid system of a first embodiment according to the present invention. In FIG. 1, a voltage control device 7 is a load ratio control transformer (LRT) as a distribution transformer installed in a substation, for example. A bus B is connected to the secondary side of the voltage control device 7. Two distribution lines 9-1 and 9-2 are connected to the bus 8 such that they are in parallel with each other. The distribution lines 9-1 and 9-2 are distribution lines of a high-voltage grid. Although FIG. 1 illustrates an example in which two distribution lines are connected, the number of distribution lines connected to the bus 8 is not limited to two.

One end of the distribution line 9-1 is connected to the bus a via a circuit breaker 6-1. A high-voltage sensor 5-1, which is a measurement device for measuring the delivery voltage and the power flow of the distribution line 9-1, is installed at the end point on the upstream side of the distribution line 9-1. One end of the distribution line 9-2 is connected to the bus 8 via a circuit breaker 6-2. A high-voltage sensor 5-2, which is a measurement device for measuring the delivery voltage and the power flow of the distribution line 9-2, is installed at the and point on the upstream side of the distribution line 9-2. The high-voltage sensor 5-1 and the circuit breaker 6-1 may be integrated with each other and realized as a switch with a sensor. In a similar manner, the high-voltage sensor 5-2 and the circuit breaker 6-2 may be integrated with each other and realized as a switch with a sensor.

The high-voltage sensors 5-1 and 5-2 measure voltages and power flows, for example, at constant intervals, and transmit average values for a certain period of time of the results of the measurement as measurement information to a distribution grid management apparatus 1 via a communication network 2. As will be described later, the high-voltage sensors 5-1 and 5-2 also have a function as a master station apparatus in a communication network 21, and they may receive measurement values of solar radiation amounts from measurement devices including measurement devices 53-1 and 53-2 described later and may transmit the measurement values to the distribution grid management apparatus 1 via the communication network. Any value may be used as a measurement interval of the high-voltage sensors 5-1 and 5-2 and as a certain period of time for which an average value is calculated. For example, the measurement interval is set to one second and the certain period of time for which an average value is calculated is set to one minute. The high-voltage sensors 5-1 and 5-2 have a communication function and are connected to the communication network 2. The high-voltage sensors 5-1 and 5-2 periodically transmit the measurement information to the distribution grid management apparatus 1 via the communication network 2. The high-voltage sensors 5-1 and 5-2 may transmit the measurement information not periodically but when the high-voltage sensors 5-1 and 5-2 receive, from the distribution grid management apparatus 1, an instruction that requests transmission of the measurement information.

Loads 3-1 to 3-3 and photovoltaic facilities 4-1 and 4-2 are connected to the distribution line 9-1. Bach of the loads 3-1, 3-2, and 3-3 indicates a load of a corresponding consumer. The load 3-1 is a load of a consumer 30-1, the load 3-2 is a load of a consumer 30-2, and the load 3-3 is a load of a consumer 30-3. FIG. 1 illustrates some of the loads and the photovoltaic facilities connected to the distribution line 9-1, but loads and photovoltaic facilities other than those illustrated in FIG. 1 are also connected to the distribution line 9-1. Although the loads and photovoltaic facilities connected to the distribution line 9-2 are omitted in FIG. 1 for the sake of simplification of the drawing, loads and photovoltaic facilities are actually also connected to the distribution line 9-2.

As illustrated in FIG. 1, the consumer 30-1 has the photovoltaic facility 4-1, and the consumer 30-2 has the photovoltaic facility 4-2. The consumer 30-3 does not have a photovoltaic facility. The consumer 30-1 has signed a total purchase contract with an electric utility to sell the electric utility the total power generation amount of the photovoltaic facility 4-1. That is, the photovoltaic facility 4-1 is the power generation facility to which the total purchase contract applies. The consumer 30-2 has signed a surplus purchase contract with the electric utility to sell the electric utility the surplus obtained by subtracting the load 3-2 from the power generation amount of the photovoltaic facility 4-2.

Smart meters 31-1, 31-2, 32, and 33 are wattmeters for performing automatic meter reading and have a communication function. In the drawings, smart meter is abbreviated as SM. The smart meter 32, which measures the power generation amount of the photovoltaic facility 4-1, is connected to the photovoltaic facility 4-1 of the consumer 30-1, who has signed a total purchase contract. The smart meter 31-1 is connected to the load 3-1 of the photovoltaic facility 4-1. The smart meter 33 is connected to the load 3-2 and the photovoltaic facility 4-2 of the consumer 30-2, who has signed a surplus purchase contract. The smart meter 31-2 is connected to the load 3-3 of the consumer 30-3. The smart meters 31-1 and 31-2 each measure the amount of electric power in a downward direction, i.e., the direction from the electric utility to the consumers. The smart meter 32 measures the amount of electric power in an upward direction, i.e., the direction from the consumer to the electric utility. The smart meter 33 measures the amount of electric power obtained by subtracting the amount of electric power in the downward direction from the amount of electric power in the upward direction. When the smart meters 31-1 and 31-2 are indicated without discriminating therebetween, the smart meters 31-1 and 31-2 are also described as smart meters 31.

The smart meters 31-1, 31-2, 32, and 33 are connected to a meter data management apparatus 20 via the communication network 21. The smart meters 31-1, 31-2, 32, and 33 measure the amount of electric power at constant measurement intervals and transmit the measured amount of electric power to the meter data management apparatus 20. That is, the communication network 21 is a communication network via which measurement data measured by smart meters are transmitted and received. In the present embodiment, the measurement interval of the smart meters 31-1, 31-2, 32, and 33 is set to 30 minutes. The measurement interval of the smart meters 31-1, 31-2, 32, and 33 is not limited to 30 minutes.

The distribution grid management apparatus 1, which is a power generation amount estimation apparatus, estimates the load amount in a distribution grid using the measurement value from a smart meter that measures the power generation amount of a photovoltaic facility of a consumer who has signed a total purchase contract, i.e., a photovoltaic facility to which a total purchase contract applies. Hereinafter, the smart meter that measures the power generation amount of the photovoltaic facility of the consumer who has signed the total purchase contract will be abbreviated to a total purchase smart meter in the description. The smart meter 32 in FIG. 1 is a total purchase smart meter. The distribution grid management apparatus 1 can be installed in an office, a control office, or the like, that controls the distribution grid being managed.

The voltage control device 7 is connected to a voltage control apparatus 80 that controls the voltage control device 7. The distribution grid management apparatus 1 transmits, for example, information indicating the upper and lower limits of the voltage control range as a voltage control amount to the voltage control apparatus 80 via the communication network 2. The voltage control apparatus 80 controls the voltage control device 7 on the basis of information received from the distribution grid management apparatus 1. Pluralities of voltage control devices (not illustrated) are connected to the distribution lines 9-1 and 9-2, and each of these voltage control devices is controlled by a corresponding voltage control apparatus. At least some of these voltage control apparatuses that control the voltage control devices may, similarly to the voltage control apparatus 80, perform control on the basis of the voltage control amount received from the distribution grid management apparatus 1 via the communication network 2. As described above, in the present embodiment, the description given will be based on the premise that the control method used is a centralized voltage control method in which the distribution grid management apparatus 1 performs voltage control of the distribution grid. Although an example will be described here in which the distribution grid management apparatus 1 also functions as a centralized voltage control apparatus that performs centralized control of a voltage, the centralized voltage control apparatus may be provided separately from the distribution grid management apparatus 1.

The measurement device 53-1 and the measurement device 53-2 that measure solar radiation amounts are connected to the communication network 21. Hereinafter, when the measurement devices 53-1 and 53-2 are indicated without discriminating therebetween, the measurement devices 53-1 and 53-2 are described as measurement devices 53. In FIG. 1, two measurement devices are illustrated, but it is satisfactory if the multiple measurement devices 53 are actually geographically dispersed over many locations, e.g., approximately one measurement device 53 is installed per square kilometer. It is desirable that the measurement device 53 be installed in a location where there are not many time periods during which the location is shaded, for example, on the north side of a road, a roof of a building, a roof of a house, a utility pole, a relay tower of a mobile communication system such as a cellular phone network. The installation location of the measurement device 53 is not limited to these.

The measurement values of the solar radiation amounts measured by the measurement devices 53 are transmitted to the communication network 2 via a master station apparatus (not illustrated) in the communication network 21. The master station apparatus may be installed separately from the master station apparatus for collecting measurement values from the smart meters, or the master station apparatus for collecting the measurement values from the smart meters may function as the master station apparatus that collects data from the measurement devices 53. The master station apparatus that collects the data from the measurement devices 53 of the present embodiment will be hereinafter referred to as a solar-radiation meter master station apparatus. The solar-radiation meter master station apparatus functions as a master station apparatus in the communication network 21 and has a function of connecting to the communication network 2. The communication network 2 and the communication network 21 are connected, as illustrated in FIG. 1, by the solar-radiation meter master station apparatus. The solar-radiation meter master station apparatus is integrated with the high-voltage sensors 5-1 and 5-2, for example. Alternatively, the solar-radiation meter master station apparatus is installed close to the high-voltage sensors 5-1 and 5-2. The installation position of the solar-radiation meter master station apparatus is not limited thereto.

The measurement device 53 includes a communicating unit 51 and a solar radiation meter 52. The communicating unit 51 performs a communication process for connecting to the communication network 21. The solar radiation meter 52 measures the solar radiation amount. The communicating unit 51 transmits the measurement value measured by the solar radiation meter 52, i.e., measurement data, to the communication network 21. The communicating unit 51 can be common to communicating units in the smart meters 31-1, 31-2, 32, and 33, which are described later.

Figure 2:
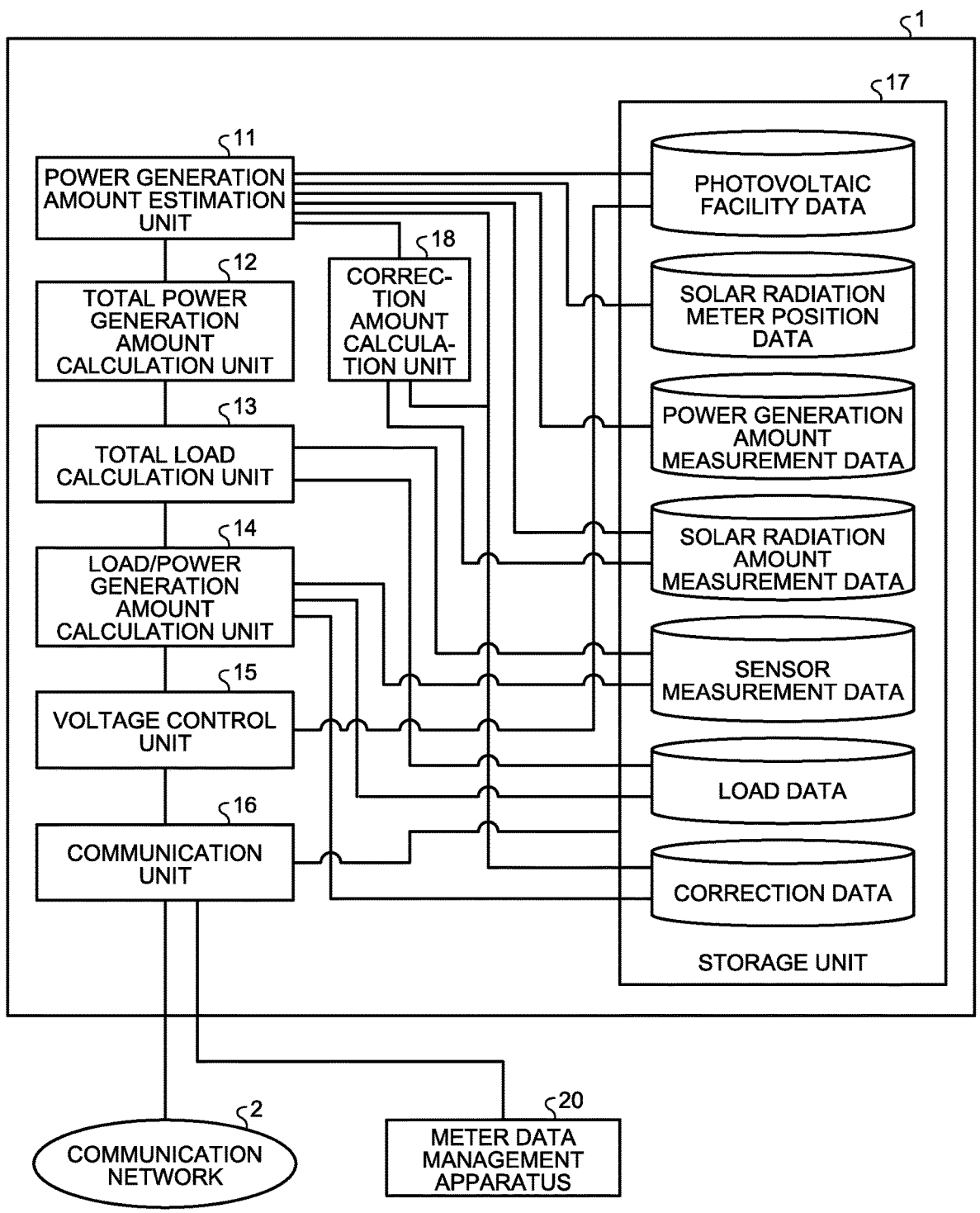
FIG. 2 is a diagram illustrating an example configuration of a distribution grid management apparatus of the embodiment.

FIG. 2 is a diagram illustrating an example configuration of the distribution grid management apparatus 1 of the present embodiment. The distribution grid management apparatus 1 includes a power generation amount estimation unit 11, a total power generation amount calculation unit 12, a total load calculation unit 13, a load/power generation amount calculation unit 14, a voltage control unit 15, a communication unit 16, a storage unit 17, and a correction amount calculation unit 18.

The power generation amount estimation unit 11 estimates a past power generation amount for each photovoltaic facility in the distribution grid by using past measurement values from the total purchase smart meters and past measurement values from the solar radiation meters, i.e., the measurement devices 53. Here, it is assumed that the distribution grid management apparatus 1 collectively acquires measurement values from the total purchase smart meters for one day via the communication network 21 and the meter data management apparatus 20, as described later. The distribution grid management apparatus 1 receives measurement values from the measurement devices 53 via the communication network 21 and the communication network 2. For this reason, it is assumed that the measurement values from the total purchase smart meters and the measurement values from the measurement devices 53 are past values, i.e., values from the day before. However, the distribution grid management apparatus 1 may be configured to be able to acquire measurement values from the total purchase smart meters in near real time. That is, when the meter data management apparatus 20 receives a measurement value from each mart meter, the meter data management apparatus 20 may store the measurement value in a storage unit 24, may determine whether the transmission source is the total purchase smart meter, and may transmit the measurement value received from the total purchase smart meter to the distribution grid management apparatus 1. Even in such a case, however, because the data collection interval of the smart meters is generally 30 minutes and the measurement value from the total purchase smart meter is an integrated value of the amount of electric power for 30 minutes, a sudden change in the weather of which the duration is less than 30 minutes is not reflected in the measurement value.

The total load calculation unit 13 calculates a past total load amount on the basis of past measurement values from the high-voltage sensors 5-1 and 5-2 and past power generation amounts, and then it stores the past total load amount as load data in the storage unit 17. At that time, the load data may be stored in association with at least one of temperature, time, and day of the week. By storing the load data in association with at least one of temperature, time, and day of the week as described above, it is possible to estimate the load amount that is in accordance with temperature, time, day of the week, or the like when estimating the present or future load amount using the past load data.

The load/power generation amount calculation unit 14 calculates the present load amount and the present power generation amount on the basis of accumulated load data, latest sensor measurement data, a latest solar radiation meter measurement value, and correction data, which will be described later. The voltage control unit 15 performs voltage control on the distribution grid. The correction amount calculation unit 18 calculates data for correcting the measurement value from each measurement device 53, i.e., each solar radiation meter, using the past measurement values from the total purchase smart meters and the past measurement values from the solar radiation meters, i.e., the measurement devices 53, and stores the calculated data in the storage unit 17 as correction data. The correction also includes determination as to whether the reliability of data from each solar radiation meter is low. The measurement values from a solar radiation meter determined to have low reliability are not used for calculation of the power generation amount performed by the load/power generation amount calculation unit 14. Here, the solar radiation meter with low reliability refers to a solar radiation meter from which measurement values are undesirable to use, such as one in which deterioration due to aged deterioration or the like is severe and therefore errors in measurement values seem large or one in which errors in measurement values seems large due to failure.

The communication unit 16 receives measurement values from the high-voltage sensors 5-1 and 5-2 and measurement values from the measurement devices 53 via the communication network 2. The communication unit 16 transmits information indicating the voltage control amount calculated by the voltage control unit 15 to the voltage control apparatus 80 or to the voltage control apparatus 80 and other voltage control apparatuses. The communication unit 16 stores the received measurement values from the high-voltage sensors 5-1 and 5-2 in the storage unit 17 as sensor measurement data. The communication unit 16 communicates with the meter data management apparatus 20. The communication unit 16 stores solar radiation amount measurement data and power generation amount measurement data received from the meter data management apparatus 20 in the storage unit 17.

Figure 3:
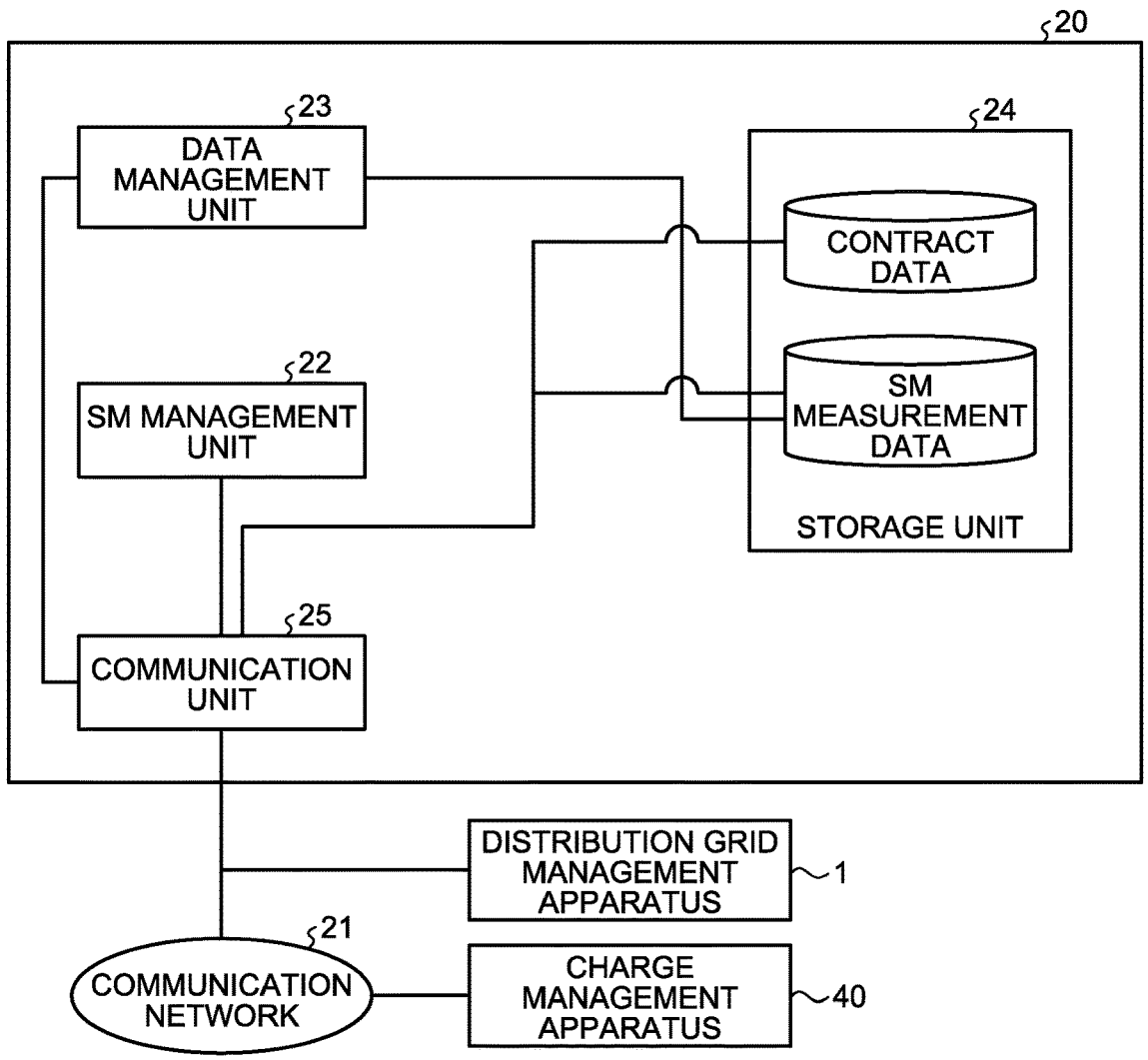
FIG. 3 is a diagram illustrating an example configuration of a meter data management apparatus of the embodiment.

FIG. 3 is a diagram illustrating an example configuration of the meter data management apparatus 20. The meter data management apparatus 20 includes an SM management unit 22, a data management unit 23, the storage unit 24, and a communication unit 25. The communication unit 25 communicates with the smart meters and the measurement devices 53 via the communication network 21. The communication unit 25 communicates with the distribution grid management apparatus 1 and a charge management apparatus 40. The charge management apparatus 40 is an apparatus that performs processes for purchasing and selling electricity including creation of a bill indicating the electricity rate that the electric utility charges each consumer and creation of a notice of the amount of electricity to be purchased by the electric utility from each consumer.

The meter data management apparatus 20 is a management apparatus called a meter data management system (MDMS). The meter data management apparatus 20 receives measurement data as measurement values of the amount of electric power, i.e., automatic meter reading data, from the smart meters 31-1, 31-2, 32, and 33, and stores SM measurement data as received measurement data in the storage unit 24. The meter data management apparatus 20 controls activation, stopping, and the like of the smart meters 31-1, 31-2, 32, and 33. The meter data management apparatus 20 may control activation, stopping, and the like of the measurement devices 53.

The SM management unit 22 performs control of activation and stopping of the mart meters, and the like. The SM management unit 22 may control activation, stopping, and the like of the measurement devices 53. The data management unit 23 manages the SM measurement data received from the smart meters. The data management unit 23 transmits the SM measurement data as measurement data from the smart meters stored in the storage unit 24 to the charge management apparatus 40 and the distribution grid management apparatus 1 via the communication unit 25. The data management unit 23 transmits power generation amount measurement data as measurement data from the total purchase smart meters among the SM measurement data stored in the storage unit 24 to the distribution grid management apparatus 1 via the communication unit 25.

Figure 4:
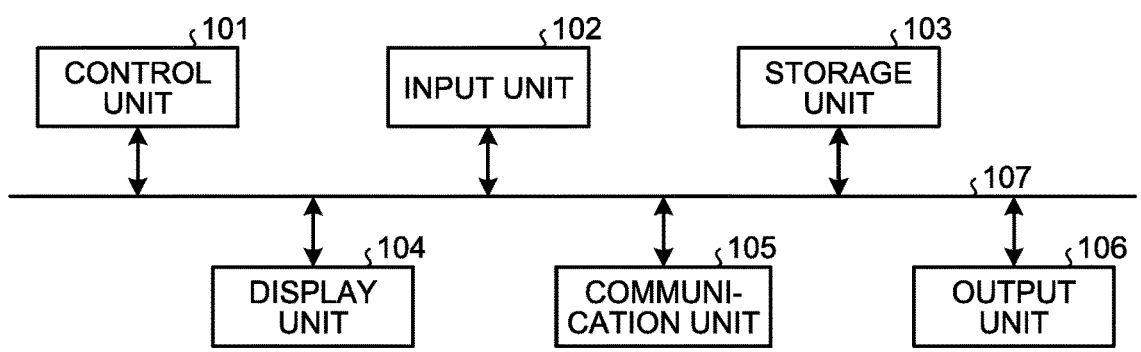
FIG. 4 is a diagram illustrating an example configuration of a computer system of the embodiment.

Specifically, the distribution grid management apparatus 1 is a computer system, i.e., a computer. By executing a distribution grid management program on the computer system, the computer system functions as the distribution grid management apparatus 1. FIG. 4 is a diagram illustrating an example configuration of the computer system of the present embodiment. As illustrated in FIG. 4, the computer system includes a control unit 101, an input unit 102, a storage unit 103, a display unit 104, a communication unit 105, and an output unit 106, which are connected via a system bus 107.

In FIG. 4, the control unit 101 is, for example, a central processing unit (CPU) or the like, and it executes the distribution grid management program of the present embodiment. The input unit 102 includes, for example, a keyboard and a mouse, and it is used by a user of the computer system in order to input various kinds of information. The storage unit 103 includes various memories, such as a random access memory (RAM) and a read only memory (ROM), and a storage device such as a hard disk, and stores programs to be executed by the control unit 101, necessary data obtained during processes, and the like. The storage unit 103 is also used as a temporary storage area for a program. The display unit 104 includes a liquid crystal display panel (LCD) and the like and displays various screens to the user of the computer system. The communication unit 105 performs a communication process. FIG. 4 is merely an example, and the configuration of the computer system is not limited to the example in FIG. 4.

Here, an example will be described of an operation of the computer system up to when the distribution grid management program of the present embodiment becomes executable. In the computer system having the above-described configuration, the distribution grid management program is installed in the storage unit 103 from a compact disc (CD)-ROM or a digital versatile disc (DVD)-ROM set in a CD-ROM drive or a DVD-ROM drive (not illustrated), for example. When the distribution grid management program is executed, the distribution grid management program read from the storage unit 103 is stored in a predetermined place in the storage unit 103. In that state, the control unit 101 executes a distribution grid management process of the present embodiment in accordance with the program stored in the storage unit 103.

In the present embodiment, a program in which the distribution grid management process is described is provided using a CD-ROM or a DVD-ROM as a recording medium, but there is no limitation thereto. For example, a program provided by a transmission medium such as the Internet via the communication unit 105 may be used depending on the configuration of the computer system, the capacity of the program to be provided, and the like.

The power generation amount estimation unit 11, the total power generation amount calculation unit 12, the total load calculation unit 13, the load/power generation amount calculation unit 14, the voltage control unit 15, and the correction amount calculation unit 18 in FIG. 2 are included in the control unit 101 in FIG. 4. The storage unit 17 in FIG. 2 is a part of the storage unit 103 in FIG. 4. The communication unit 16 in FIG. 2 corresponds to the communication unit 105 in FIG. 4.

As is the case with the distribution grid management apparatus 1, the meter data management apparatus 20 is also specifically a computer system. When the meter data management apparatus 20 is mounted on the computer system illustrated in FIG. 4, the SM management unit 22 and the data management unit 23 in FIG. 3 are included in the control unit 101 in FIG. 4. The storage unit 24 in FIG. 3 is a part of the storage unit 103 in FIG. 4, and the communication unit 25 in FIG. 3 corresponds to the communication unit 105 in FIG. 4. An example of an operation of the computer system up to when the meter data management program, which is a program for realizing the meter data management apparatus 20 of the present embodiment, becomes executable is similar to the example of the operation of the computer system up to when the distribution grid management program becomes executable.

Figure 5:
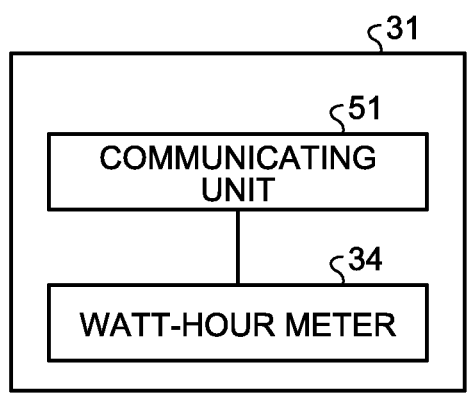
FIG. 5 is a diagram illustrating an example configuration of a smart meter of the embodiment.
Figure 6:
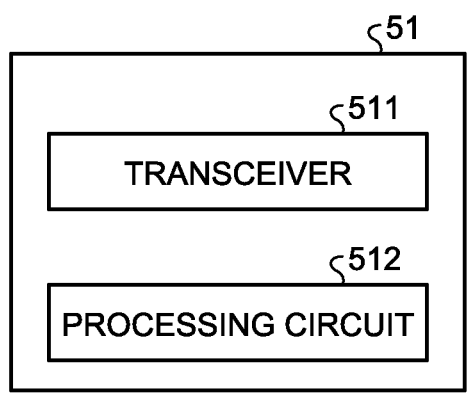
FIG. 6 is a diagram illustrating an example configuration of a communicating unit of the embodiment.

FIG. 5 is a diagram illustrating an example configuration of the smart meter 31 of the present embodiment. The smart meter 31 includes the communicating unit 51 and a watt-hour meter 34. The communicating unit 51 performs a communication process for connecting to the communication network 21. The watt-hour meter 34 measures the amount of electric power. FIG. 6 is a diagram illustrating an example configuration of the communicating unit 51. The communicating unit 51 includes a transceiver 511 and a processing circuit 512. The transceiver 511 performs a communication process. The processing circuit 512 controls an operation of the communicating unit 51 and transmits measurement data from the watt-hour meter 34 to the meter data management apparatus 20 via the transceiver 511 at certain time intervals. The processing circuit 512 is, for example, a control circuit including a CPU and a memory. The communicating unit 51 can be used as the communicating unit 51 of the measurement device 53 described above.

The smart meters 32 and 33 each have a configuration similar to that of the smart meter 31. However, the watt-hour meter 34 of the smart meter 32 measures the amount of electric power in an upward direction, i.e., the direction from the consumer to the electric utility. In addition, the watt-hour meter 34 of the smart meter 33 measures the amount of electric power obtained by subtracting the amount of electric power in a downward direction from the amount of electric power in the upward direction supplied to the distribution line.

Next, operations of the present embodiment will be described. The distribution grid management apparatus 1 of the present embodiment estimates the power generation amount for each photovoltaic facility by using measurement values from the total purchase smart meters installed to perform automatic meter reading and measurement values from the measurement devices 53. Then, the distribution grid management apparatus 1 obtains the total power generation amount for each distribution line on the basis of the power generation amount for each photovoltaic facility and obtains the total load amount for each distribution line. In the following, an example will be described in which only the power generation amounts of photovoltaic facilities are considered as the total power generation amount. However, when power generation facilities other than the photovoltaic facilities are connected to the distribution line, the power generation amounts of the power generation facilities may be added thereto, and the sum thus obtained may be used as the total power generation amount. In such a case, it is assumed that the power generation amounts of the power generation facilities other than the photovoltaic facilities are known.

Here, an example will be described in which the power generation amount of each photovoltaic facility is estimated by using the measurement values from the total purchase smart meters and the measurement values from the measurement devices 53. However, the power generation amount of each photovoltaic facility may be estimated on the basis only of the measurement values from the measurement devices 53.

The total purchase smart meters are installed to perform automatic meter reading. With the use of measurement values from the total purchase smart meters, it is possible to obtain the power generation amount of the corresponding photovoltaic facilities without adding a facility such as a solar radiation meter. However, with regard to photovoltaic facilities that are not compatible with total purchase smart meters, it is impossible to know the power generation amounts from the measurement values from the smart meters. Because the power generation amount of a photovoltaic facility depends on the solar radiation amount, which varies depending on the weather conditions, it is possible to estimate the power generation amount of a photovoltaic facility that is not compatible with a total purchase smart meter by using a measurement value from a total purchase smart meter present in a geographically close position. However, there are same photovoltaic facilities that have no total purchase smart meter nearby. For this reason, in the present embodiment, the measurement devices 53 for measuring the solar radiation amounts are arranged as evenly as possible geographically, and the measurement values from the measurement devices 53 are collected via the communication network 21 constituting a smart meter network. The smart meter network is a network used for collecting measurement values from smart meters that measure the amount of electric power, and it includes the communication network 21 and the meter data management apparatus 20. For the photovoltaic facility that has no total purchase smart meter nearby, the power generation amount is estimated by using measurement values from the measurement devices 53. Thus, it is not necessary to provide an additional network for the solar radiation meters, and it is possible to obtain the total power generation amount of the distribution line while at the same time preventing an increase in costs.

An SM number, which is a number for identifying a smart meter, is assigned to each smart meter. In the same way as they are assigned to each smart meter, an SM number is also assigned to each measurement device 53 in the present embodiment. Here, SM numbers are assigned to the smart meters and the measurement devices 53 as described above, but the numbers assigned to the smart meters and the numbers assigned to the measurement devices 53 may be from different numbering systems to each other.

FIG. 7 is a diagram illustrating an example configuration of measurement data transmitted by the smart meters 31-1, 31-2, 32, and 33. As illustrated in FIG. 7, the measurement data transmitted by each of the smart meters 31-1, 31-2, 32, and 33 includes the SM number, which is a number for identifying the smart meter, as well as a power consumption amount and a power generation amount as measurement results. The power consumption amount and the power generation amount are generally integrated values, and the values are updated at 30-minute intervals. That is, the power consumption amount is a value to which the amount of electric power consumed in the last 30 minutes is added sequentially, and the power generation amount is a value to which the amount of power generated in the last 30 minutes is added sequentially.

For smart meters connected only to loads or photovoltaic facilities, it is not necessary to include the power generation amount or the power consumption amount in the measurement data. Here, however, all the smart meters are assumed to transmit the measurement data illustrated in FIG. 7 so that there is a unified format. The format of the measurement data is not limited to that in FIG. 7, and different formats may be used depending on what is targeted to be measured by the smart meters. The measurement data may include information other than the information illustrated in FIG. 7.

FIG. 8 is a diagram illustrating an example configuration of measurement data transmitted by the measurement devices 53. As illustrated in FIG. 8, the measurement data transmitted by the measurement device 53 includes an SM number and a solar radiation amount as a measurement result. In the measurement device 53, the measurement value from the solar radiation meter 52 is transmitted directly or after being subjected to a smoothing process to the distribution grid management apparatus 1 via the communication network 21 and the communication network 2 as the measurement data illustrated in FIG. 8, at certain time intervals, for example, at one-minute intervals. The certain time is not limited to one minute and it is satisfactory as long as the certain time is shorter than the data collection interval of each smart meter. The communication network 21 is connected to the communication network 2 via the solar-radiation meter master station apparatus in the communication network 21.

Figure 9:
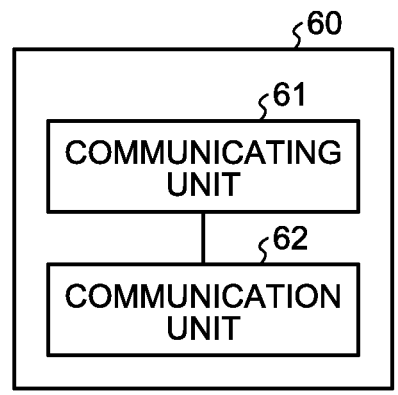
FIG. 9 is a diagram illustrating an example configuration of a solar-radiation meter master station apparatus.

FIG. 9 is a diagram illustrating an example configuration of the solar-radiation meter master station apparatus. As illustrated in FIG. 9, the solar-radiation meter master station apparatus 60 includes a communicating unit 61 and a communication unit 62. The communicating unit 61 is the same hardware as the communicating unit in the master station apparatus for the smart meters, and the hardware configuration thereof is similar to that in FIG. 6. The communicating unit 61 collects measurement values from the measurement devices 53 via the communication network 21, and it outputs the measurement values to the communication unit 62. The communication unit 62 transmits the measurement values to the distribution grid management apparatus 1 via the communication network 2.

The solar-radiation meter master station apparatus may be integrated with a high-voltage sensor such as the high-voltage sensors 5-1 and 5-2. The high-voltage sensors 5-1 and 5-2 each include a measuring unit and a communicating unit. When the high-voltage sensors 5-1 and 5-2 as well as the circuit breakers 6-1 and 6-2 are each realized as a switch with a sensor, the switch with a sensor and the solar-radiation meter master station apparatus may be integrated. Because the high-voltage sensor such as the high-voltage sensors 5-1 and 5-2 and the switch with a sensor are connected to the communication network 2, a line of the communication network 2 is laid in the vicinity of the high-voltage sensor such as the high-voltage sensors 5-1 and 5-2 and the switch with a sensor. Therefore, when the solar-radiation meter master station apparatus is integrated with the high-voltage sensor such as the high-voltage sensors 5-1 and 5-2 or the switch with a sensor, the solar-radiation meter master station apparatus can connect to the communication network 2 using the line, and there is no need to lay an additional communication network 2 for the solar-radiation meter master station apparatus. Even in a case where the solar-radiation meter master station apparatus is not integrated with the high-voltage sensor such as the high-voltage sensors 5-1 and 5-2 or the switch with a sensor, if the solar-radiation meter master station apparatus is installed in proximity thereto, there is no need to lay the communication network 2 for the solar-radiation meter master station apparatus.

The switch with a sensor includes a switch unit, a sensor unit, and a slave station. The switch unit connects and disconnects an electric path. The sensor unit measures the voltage and the like. The slave station performs communication and controls the switch unit and the sensor unit. The solar-radiation meter master station apparatus is configured, for example, to be integrated with the slave station of the switch with a sensor. The solar-radiation meter master station apparatus is similar to the communicating unit 51 in the measurement device 53 in that it includes, as hardware, a transceiver and a processing circuit.

Figure 10:
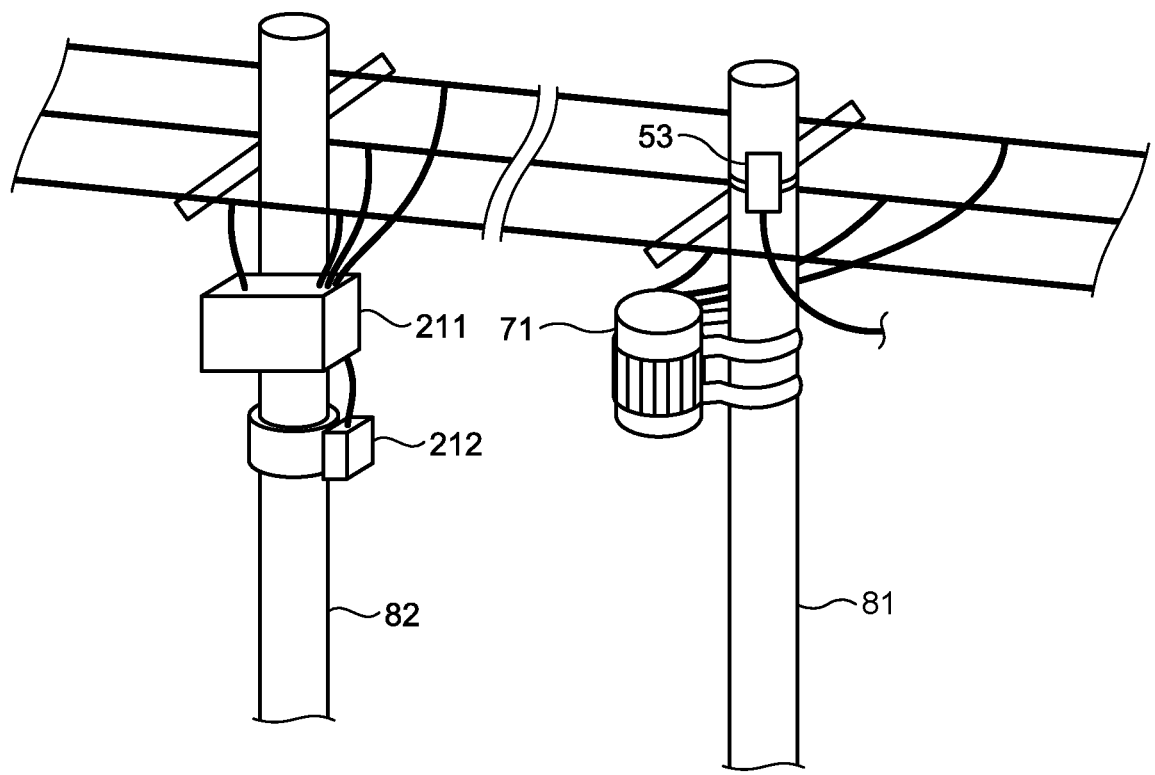
FIG. 10 is a view illustrating an example of installation of the measurement device and the solar-radiation meter master station apparatus.
Figure 11:
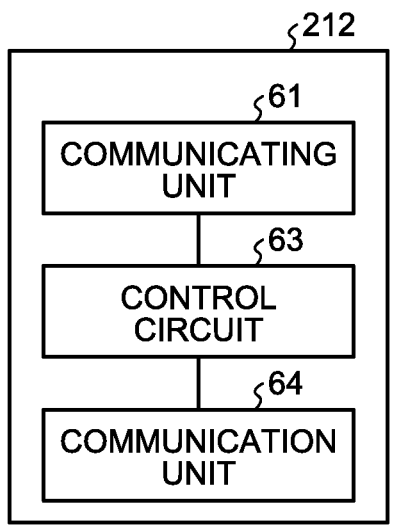
FIG. 11 is a diagram illustrating an example configuration of a slave station integrated with the solar-radiation meter master station apparatus.

The measurement device 53 is installed, for example, for each pole transformer (not illustrated in FIG. 1) connected to the distribution lines 9-1 and 9-2. The pole transformer is a transformer that converts high voltage-power into low-voltage power and outputs the converted power to the low-voltage distribution line. FIG. 10 is a view illustrating an example of installation of the measurement device 53 and the solar-radiation meter master station apparatus. FIG. 10 illustrates an example in which the solar-radiation meter master station apparatus is incorporated in a slave station of a switch with a sensor. FIG. 11 is a diagram illustrating an example configuration of a slave station 212 integrated with the solar-radiation meter master station apparatus. In FIG. 10, an example is illustrated in which the slave station 212 is integrated with the solar-radiation meter master station apparatus as illustrated in FIG. 11.

In the example illustrated in FIG. 10, the measurement device 53 is installed on a utility pole 81 on which a pole transformer 71 is installed. The solar radiation meter 52 of the measurement device 53 is desirably installed in a location unlikely to be shaded. Therefore, the solar radiation meter 52 is installed on a portion as high as possible on the utility pole 81, for example. In the example illustrated in FIG. 10, the switch with a sensor includes the slave station 212 and both switch unit and measurement unit 211. The slave station 212 is integrated with the solar-radiation meter master station apparatus. As illustrated in FIG. 11, the slave station 212 includes the communicating unit 61, a control circuit 63, and a communication unit 64. The communicating unit 61 is similar to the communicating unit 61 illustrated in FIG. 9. The communicating unit 61 outputs a measurement value received from the measurement device 53 to the communication unit 64. The control circuit 63 controls the switch unit and measurement unit 211. The communication unit 64 transmits a measurement value from the measurement unit of the switch unit and measurement unit 211 and the measurement value from the measurement device 53 to the distribution grid management apparatus 1 via the communication network 2.

The example configurations in FIGS. 10 and 11 are merely examples, and the solar-radiation meter master station apparatus may be provided independently of the slave station of the switch with a sensor. In a case where the solar-radiation meter master station apparatus is installed independently of the slave station of the switch with a sensor, if the solar-radiation meter master station apparatus is installed on a utility pole where the switch with a sensor is installed, a line in the communication network 2 laid for the switch with a sensor can be used, and, in addition, a power supply for the switch with a sensor can be used. If the solar-radiation meter master station apparatus is installed on a utility pole where the pole transformer is installed, although it is necessary to lay a line in the communication network 2 for the solar-radiation meter master station apparatus, the power supply provided for the pole transformer can be used as a power supply.

The measurement device 53 may perform a smoothing process on the measured solar radiation amount and may transmit the data after the smoothing process as a measurement value. As the smoothing process performed by the measurement device 53, it is possible to use a process employing a first-order lag filter, which is, for example, a process employing a moving average or a section average of measurement values for a certain period of time such as one minute. The smoothing process is performed by the processing circuit 512 of the communicating unit 51 of the measurement device 53. As described above, the communicating unit 51 of the measurement device 53 used is common to the communicating unit 51 of the smart meter. In the case of performing the above smoothing process, a function of performing the smoothing process is added to the processing circuit 512, but this function can be added by adding simple software or a simple dedicated circuit. Alternatively, another circuit for performing the smoothing process may be provided separately from the processing circuit 512.

Figure 12:
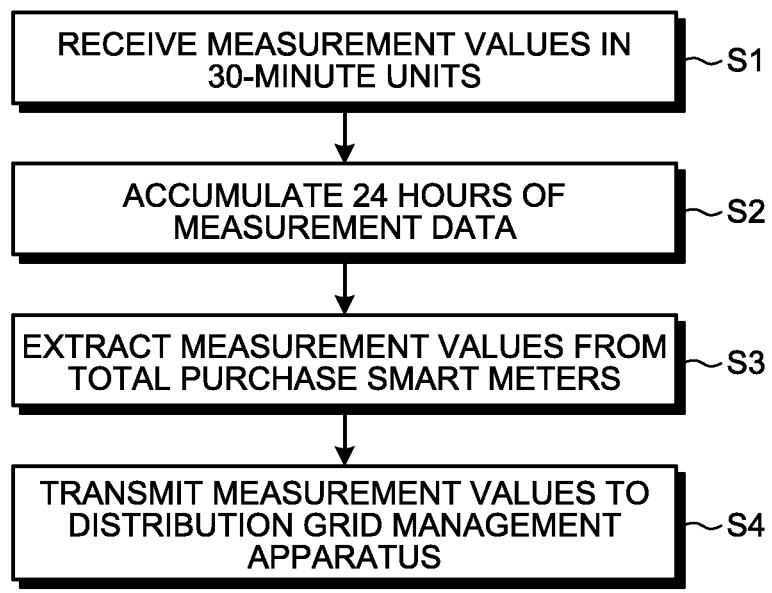
FIG. 12 is a flowchart illustrating an example of a processing procedure of measurement values of the smart meters in the meter data management apparatus.

FIG. 12 is a flowchart illustrating an example of a processing procedure of measurement values from the smart meters in the meter data management apparatus 20. The meter data management apparatus 20 receives measurement values in 30-minute units from the smart meters and the measurement devices 53 (step S1). Specifically, the communication unit 25 receives the measurement values from the smart meters and the measurement devices 53 via the communication network 21, and then it stores the measurement data as SM measurement data in the storage unit 24.

The meter data management apparatus 20 accumulates 24 hours of the received measurement data (Step S2). Specifically, 24 hours of the received measurement data are accumulated in the storage unit 24 as SK measurement data. Thereafter, the data management unit 23 of the meter data management apparatus 20 extracts the measurement values from the total purchase smart meters from the accumulated 24 hours of SK measurement data (Step S3).

Figures 13, 14:
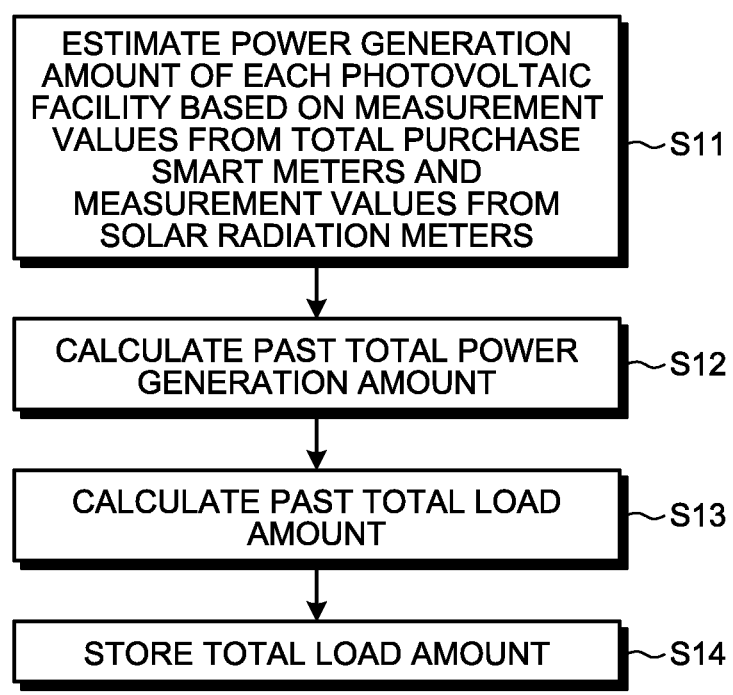
FIG. 13 is a diagram illustrating an example of contract data stored in a storage unit of the meter data management apparatus of the embodiment.
FIG. 14 is a flowchart illustrating an example of a load data calculation processing procedure performed by the distribution grid management apparatus of the embodiment.

The meter data management apparatus 20 stores, as contract data, an SM number and contract information on a consumer corresponding to the am number in the storage unit 24 in association with each other. The contract information includes the type of photovoltaic (PV) contract that is information indicating the contract type concerning a photovoltaic power generation amount. The PV contract type is information indicating whether the consumer has signed a total purchase contract or a surplus purchase contract, or it is information indicating that the consumer has not signed a contract regarding photovoltaic power generation, i.e., the consumer has no photovoltaic facility. FIG. 13 is a diagram illustrating an example of contract data stored in the storage unit 24. The contract data includes an S number, the customer number of the consumer corresponding to the SM number, the PV contract type corresponding to the customer number, and the SM type that is information indicating whether measurement by the smart meter is in an upward direction or a downward direction. Here, because each of the measurement devices 53 is handled similarly to the smart meters and the SM number is assigned thereto, each of the measurement devices 53 is handled as an SM in a broad sense. For this reason, here, the data management unit 23 extracts measurement values from the total purchase smart meters from measurement data by using the contract data (Step S3). Then, the data management unit 23 transmits the measurement values from the total purchase smart meters for one day to the distribution grid management apparatus 1 via the communication unit 25 (Step S4).

In the distribution grid management apparatus 1, the communication unit 16 stores the measurement values from the total purchase smart meters received from the meter data management apparatus 20 in the storage unit 17 as SM measurement data. Here, the distribution grid management apparatus 1 receives the SM measurement data from the meter data management apparatus 20 via a communication line. However, the distribution grid management apparatus 1 may acquire the SM measurement data via a medium other than the communication line. This means that the communication unit 16 is one form of an acquisition unit that acquires the SM measurement data and the solar radiation amount measurement data, and the acquisition unit may be an input unit that reads the medium or the like.

FIG. 14 is a flowchart illustrating an example of a load data calculation processing procedure performed by the distribution grid management apparatus 1. In the distribution grid management apparatus 1, the power generation amount estimation unit 11 estimates the power generation amount of each photovoltaic facility by using 24 hours of measurement values from the total purchase smart meters and measurement values from the solar radiation meters stored as m measurement data (Step S11). At that time, regarding the past measurement values from the solar radiation meters, i.e., the measurement devices 53, the distribution grid management apparatus 1 refers to the correction data, and it does not use measurement values from solar radiation meters with low reliability. Moreover, regarding measurement values from solar radiation meters for which correction is necessary, the distribution grid management apparatus 1 uses a value corrected on the basis of a correction value.

A method for calculating correction data will be described later. The correction data includes, for example, a binary flag indicating whether the reliability is low and a correction value for each solar radiation meter. A binary flag indicating whether correction is necessary may be further included in the correction data, but here, a flag indicating whether correction is necessary may be omitted by calculating the correction value as a coefficient by which the measurement value is multiplied and setting the correction value to 1 in a case where correction is not necessary. The binary flag indicating whether the reliability is low and the binary flag indicating whether correction is necessary may be collectively set as one flag. In that case, the flag indicates three levels of state, i.e., a value indicating that the reliability is low and the measurement value cannot be used; a value indicating that correction is necessary; and a value indicating that correction is not necessary and the measurement value can be used as it is.

Specifically, in Step S11, first, the power generation amount estimation unit 11 refers to the contract data and classifies the photovoltaic facilities as either a photovoltaic facility connected to a total purchase smart meter or a photovoltaic facility other than those. For each of the photovoltaic facilities connected to the total purchase smart meters, the power generation amount estimation unit 11 uses the measurement value from the total purchase smart meter as it is as an estimation value of the power generation amount of the photovoltaic facility. In contrast, for photovoltaic facilities that are not connected to total purchase smart meters, it is not possible to directly obtain the power generation amount from the measurement values from the smart meters. The amount of power generation of each of the photovoltaic facilities that are not connected to total purchase smart meters is estimated using at least one of the measurement value from the total purchase smart meter connected to another photovoltaic facility and the measurement value from the measurement device 53.

When the power generation amount of each of the photovoltaic facilities that are not connected to total purchase smart meters is estimated from the total purchase smart meter connected to another photovoltaic facility, there is no need for new facilities, and thereby it is possible to suppress costs. In contrast, because the number of photovoltaic facilities that are connected to total purchase smart meters is limited, in a case where there is no photovoltaic facility that is connected to a total purchase smart meter in the vicinity, the estimation error increases during estimation of the power generation amount of the photovoltaic facility that is not connected to a total purchase smart meter. This is because the power generation amount of a photovoltaic facility depends on the solar radiation amount, and it is more likely that the solar radiation amounts obtained at positions geographically far away from each other are different.

For this reason, in the present embodiment, estimation accuracy of the power generation amount of each of the photovoltaic facilities that are not connected to total purchase smart meters is increased by arranging the solar radiation meters 52 of the measurement devices 53 such that they are geographically dispersed and thus enabling the measurement values from the measurement devices 53 to be used. The distribution grid management apparatus 1 collects the measurement values from the measurement devices 53 via the communication network 21 and the meter data management apparatus 20, which are a smart meter network, thereby eliminating the need for the installation of a communication network for collecting measurement values from the solar radiation meters 52. As a result, it is possible to improve the estimation accuracy of the power generation amount while at the same time suppressing costs. For example, regarding the installation of the measurement devices 53, one measurement device 53 is arranged per square kilometer. As described above, the measurement device 53 may be installed for each pole transformer. The solar radiation meter 52 of the measurement device 53 does not have to be arranged in a place where the total purchase smart meter is located nearby.

In the distribution grid management apparatus 1 of the present embodiment, photovoltaic facility data and solar radiation meter position data are stored in the storage unit 17. FIG. 15 is a diagram illustrating an example configuration of the photovoltaic facility data. As illustrated in FIG. 15, the photovoltaic facility data of the present embodiment includes an SM number that is the SM number of the smart meter to which a photovoltaic facility is connected, latitude and longitude as an installation position of a photovoltaic facility, and a PV panel capacity that is the capacity of the solar panel (Photovoltaics (PV) panel) of a photovoltaic facility.

FIG. 16 is a diagram illustrating an example configuration of the solar radiation meter position data. As illustrated in FIG. 16, an SM number that is the SM number of the measurement device 53 and an installation position of the solar radiation meter 52 of the measurement device 53, i.e., latitude and longitude as an installation position of the measurement device 53, are included. In the following description, the position of each of the solar radiation meters 52 of the measurement devices 53 is referred to as the position of each of the measurement devices 53. The photovoltaic facilities that are not connected to total purchase smart meters and the measurement devices 53 are also referred to as measurement points.

Figure 17:
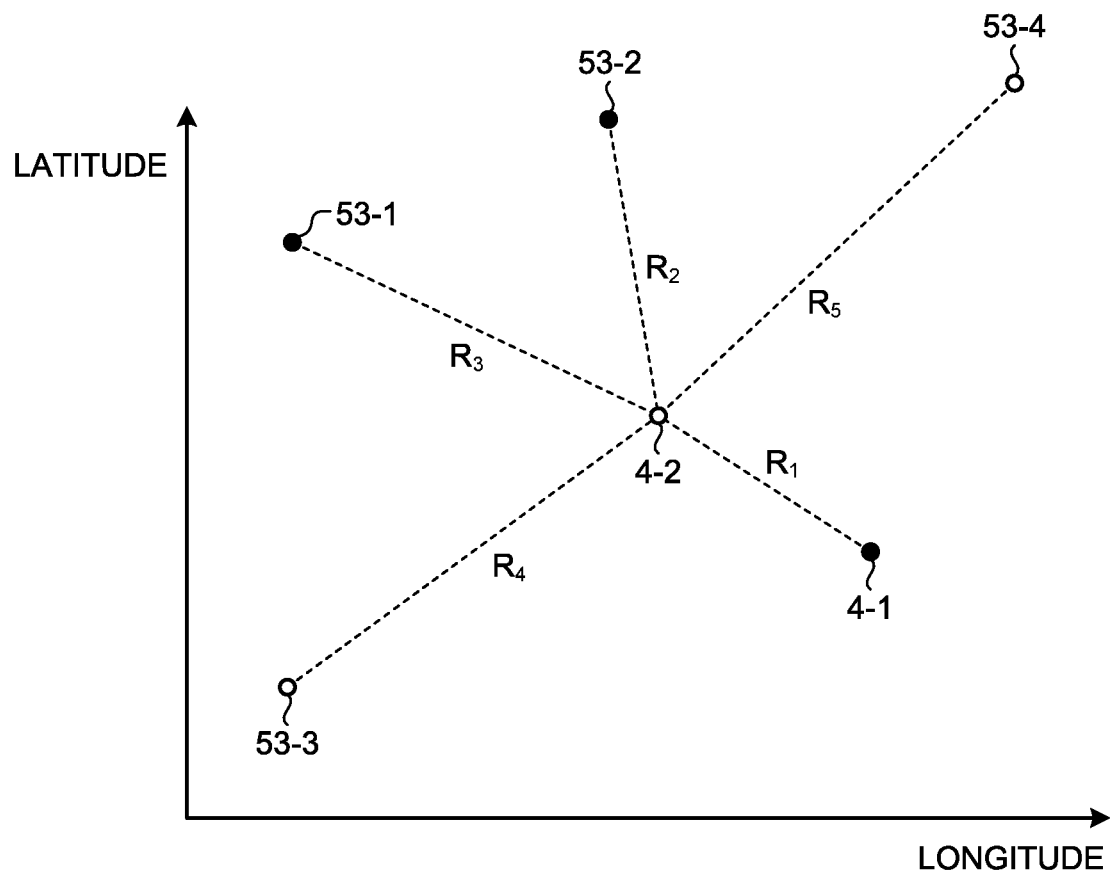
FIG. 17 is a diagram illustrating an example of a method for estimating the power generation amount of a photovoltaic facility that is not connected to a total purchase smart meter of the embodiment.

For example, the power generation amount estimation unit 11 estimates the power generation amount of a photovoltaic facility that is not connected to a total purchase smart meter on the basis of the measurement values of the power generation amounts of the photovoltaic facilities connected to the total purchase smart meters and/or the measurement values from the solar radiation meters. The photovoltaic facilities connected to the total purchase smart meters and/or the solar radiation meters, the number of which is three in total, are selected in ascending order of the distance from the photovoltaic facility that is not connected to a total purchase smart meter. FIG. 17 is a diagram illustrating an example of a method for estimating the power generation amount of a photovoltaic facility that is not connected to a total purchase smart meter of the present embodiment. FIG. 17 illustrates an example in which the power generation amount of the photovoltaic facility 4-2 is estimated. In the example in FIG. 17, there are the photovoltaic facility 4-1 connected to the total purchase smart meter and the measurement devices 53-1 to 53-4 around the photovoltaic facility 4-2.

The power generation amount estimation unit 11 refers to the photovoltaic facility data and extracts the latitude and longitude corresponding to the SM number of the smart meter connected to the photovoltaic facility 4-2, i.e., the latitude and longitude of the photovoltaic facility 4-2, and the PV panel capacity. Next, the power generation amount estimation unit 11 refers to the photovoltaic facility data and the solar radiation meter position data and calculates the distance between the latitude and longitude of the photovoltaic facility 4-2 and each of the positions of the photovoltaic facility connected to the total purchase smart meter and the measurement devices 53. The distance here does not have to be an actual distance and may be a distance as it is in a latitude and longitude coordinate system on a latitude and longitude plane. This is because it is only necessary to know the relative distance between the photovoltaic facility 4-2 and the position of the photovoltaic facility connected to the total purchase smart meter and the position of each measurement device 53.

In the example in FIG. 17, the distance between the photovoltaic facility 4-2 and the photovoltaic facility 4-1 is $R_1$, the distance between the photovoltaic facility 4-2 and the measurement device 53-1 is $R_3$, the distance between the photovoltaic facility 4-2 and the measurement device 53-2 is $R_2$, the distance between the photovoltaic facility 4-2 and the measurement device 53-3 is $R_4$, and the distance between the photovoltaic facility 4-2 and the measurement device 53-4 is $R_5$. In the example in FIG. 17, $R_1<R_2<R_3<R_5$ is assumed to be satisfied. In that case, the power generation amount estimation unit 11 selects three measurement points in ascending order of the distance from the photovoltaic facility 4-2, i.e., the photovoltaic facility 4-1, the measurement device 53-2, and the measurement device 53-1, and estimates the power generation amount of the photovoltaic facility 4-2 on the basis of the measurement values corresponding to the selected three measurement points.

Specifically, the power generation amount estimation unit 11 extracts a measurement value $M_{4-1}$ of the power generation amount of the SM number corresponding to the photovoltaic facility 4-1 from the ON measurement data, and it also extracts PV panel capacities $P_{4-1}$ and $P_{4-2}$ of the SM numbers corresponding to the photovoltaic facility 4-1 and the photovoltaic facility 4-2 from the photovoltaic facility data. The power generation amount estimation unit 11 extracts measurement values $L_{53-2}$ and $L_{53-1}$ corresponding to the SM numbers of the measurement device 53-2 and the measurement device 53-1 from the solar radiation amount measurement data. The power generation amount estimation unit 11 calculates an estimation value $E_{4-2}$ of the power generation amount of the photovoltaic facility 4-2 in accordance with the following formula (1). "α" is a coefficient for converting a solar radiation amount into a ratio of the power generation amount to the panel capacity of the photovoltaic facility (hereinafter also referred to as power generation efficiency) and is a predetermined value. "α" may be changed depending on the season. Here, "α" is fixed for all of the solar radiation meters, but "α" may be individually set for each solar radiation meter. The measurement value from the solar radiation meter is assumed to be a solar radiation amount per unit area.

$$E_{4-2}=(M_{4-1}\times P_{4-2}/P_{4-1}+\alpha\times P_{4-2}\times(L_{53-2}+L_{53-1}))/3 \quad (1)$$

If the above is generalized, the following process will be performed. In a case where the selected three measurement points include a photovoltaic facility that is connected to a total purchase smart meter, the power generation amount estimation unit 11 obtains the power generation efficiency from the measurement value of the power generation amount of the photovoltaic facility. Then, an individual estimation value is obtained by multiplying the obtained power generation efficiency by the PV panel capacity of the photovoltaic facility to be estimated. In a case where the measurement device 53 is included in the selected three measurement points, the power generation amount estimation unit 11 obtains an individual estimation value by multiplying the coefficient for converting the solar radiation amount into the power generation efficiency, the PV panel capacity of the photovoltaic facility to be estimated, and the measurement value from the measurement device 53 together. Then, the power generation amount estimation unit 11 obtains an average value of the individual estimation values for the three measurement points as an estimation value of the power generation amount. The power generation amount estimation unit 11 calculates, as described above, the estimation values of the power generation amounts for all of the photovoltaic facilities that are not connected to total purchase smart meters.

Here, the power generation amount of a photovoltaic facility that is not connected to a total purchase smart meter is estimated on the basis of the measurement values from the three measurement points selected in ascending order of the distance from the photovoltaic facility that is not connected to a total purchase smart meter. However, the number of measurement points used for estimation is not limited to three. However, in order to reduce the influence of individual differences due to installation environments, it is desirable to use measurement values from a plurality of measurement points.

Returning to the description of FIG. 14, after Step 11, the total power generation amount calculation unit 12 calculates a past total power generation amount (step S12). Specifically, the total power generation amount calculation unit 12 obtains the sum of the power generation amounts of all the photovoltaic facilities connected to the distribution line among the power generation amounts estimated for the respective photovoltaic facilities in Step S11. In the following, an example will be described in which the total load amount of the loads connected to the distribution line 9-1 is obtained. For the distribution line 9-2 as well, the total load amount can be similarly obtained. Here, the power generation amounts of the photovoltaic facilities are obtained as the total power generation amount, but, as described above, the total power generation amount may be obtained by also adding the power generation amounts of power generation facilities other than the photovoltaic facilities.

Next, the total load calculation unit 13 calculates a past total load amount (step S13). Specifically, the total load calculation unit 13 first extracts, from the sensor measurement data in the storage unit 17, a measurement value $P_F$ of a power flow measured by the high-voltage sensor 5-1 in a time period corresponding to a total power generation amount $P_C$ calculated by the total power generation amount calculation unit 12. The total load calculation unit 13 obtains a total load amount P by using the following formula (2) on the basis of the total power generation amount $P_C$ and the extracted $P_F$. The total load calculation unit 13 divides 24 hours into units of 30 minutes and calculates the total load amounts in units of 30 minutes for 24 hours.

$$P_L = P_F - P_C \qquad (2)$$

Figure 18:
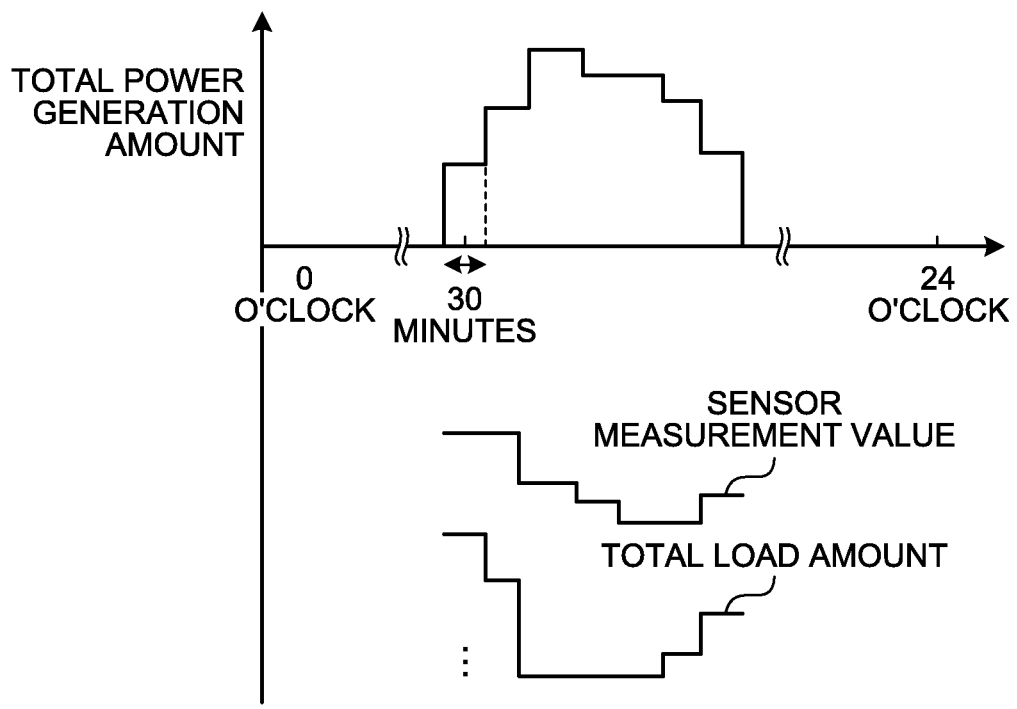
FIG. 18 is a diagram illustrating the concept of a total load amounts for 24 hours of the embodiment.

The total load calculation unit 13 stores the calculated total load amounts in 30-minute units for 24 hours in the storage unit 17 as load data (step S14). FIG. 18 is a diagram illustrating the concept of the total load amounts for 24 hours. The upper part of FIG. 18 illustrates total PV power generation amounts in 30-minute units; the middle part illustrates measurement values of the power flow measured by the high-voltage sensor in 30-minute units; and the lower part illustrates total load amounts in 30-minute units. The total load calculation unit 13 stores the total load amounts in 30-minute units for 24 hours illustrated in the lower part in the storage unit 17 as load data.

The distribution grid management apparatus 1 performs the above process every time it receives 24 hours of measurement values from the total purchase smart meters and measurement values from the measurement devices 53. As a result, past total load amounts are accumulated as load data in the storage unit 17.

Next, a process performed by the correction amount calculation unit 18 will be described. The correction amount calculation unit IS calculates a correction coefficient using measurement values from the solar radiation meters within a certain range and under the same conditions from among the solar radiation amount measurement data stored in the storage unit 17. The same conditions indicate that the actual solar radiation amounts are the same and indicate, for example, the measurement values on fine days during the same season and at the same time of day. Alternatively, when solar radiation amounts are known by other measuring units, for example, solar radiation amounts from a meteorological agency or the like, a method may be employed in which a solar radiation amount is extracted for a time when the same solar radiation amounts are obtained by other measuring units. For example, as to whether it is fine weather, the distribution grid management apparatus 1 may obtain weather data for each position, and it may add a flag as to whether it is data during fine weather to each measurement data from the solar radiation meter. Alternatively, a user may designate an area and date and time that are under the same conditions on the basis of past weather information. From the solar radiation amount measurement data, the correction amount calculation unit 18 extracts measurement values from multiple solar radiation meters that have geographical positions under the same conditions, i.e., measurement points within a certain range.

Figure 19:
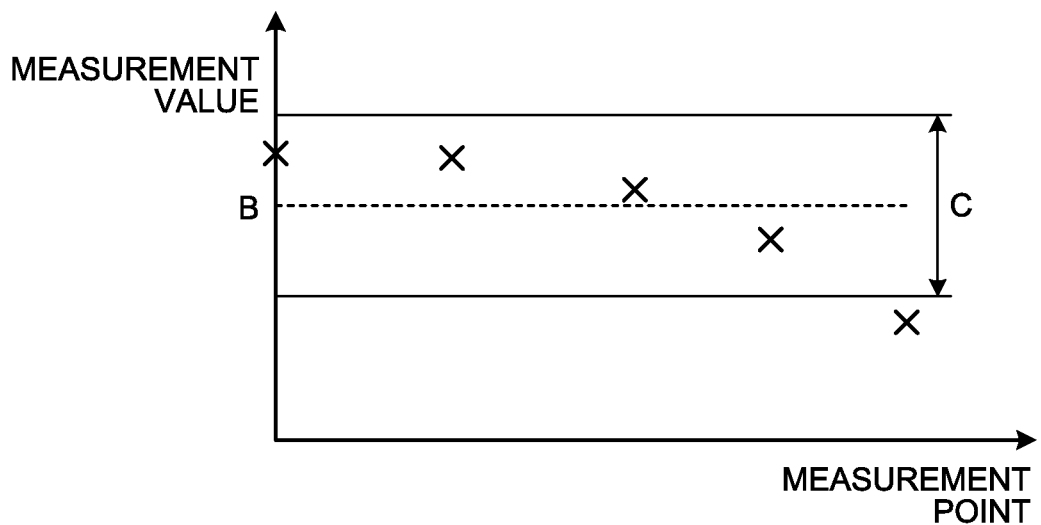
FIG. 19 is a diagram illustrating an example of measurement values extracted by a correction amount calculation unit.

FIG. 19 is a diagram illustrating an example of measurement values extracted by the correction amount calculation unit 18. In FIG. 19, the horizontal axis represents measurement points and the vertical axis represents measurement values. As illustrated in FIG. 19, the measurement values at multiple measurement points within a certain range are assumed to have variations. The correction amount calculation unit 18 calculates the average value of the measurement values for the multiple measurement points. "B" illustrated in FIG. 19 illustrates the average value of the measurement values for the multiple measurement points. For example, a range including a certain percentage of areas above and below the average value is defined as a normal range in advance, and the correction amount calculation unit 18 determines that the reliability is low for a solar radiation meter corresponding to a measurement value deviating from the normal range, and it determines that the reliability is not low for a solar radiation meter corresponding to a measurement value within the normal range. "C" illustrated in FIG. 19 illustrates an example of the normal range. In the example in FIG. 19, the measurement value for the rightmost measurement point deviates from the normal range, and the other measurement values are within the normal range. Therefore, in a case of the example illustrated in FIG. 19, the correction amount calculation unit 18 determines that the reliability is low for the solar radiation meter corresponding to the rightmost measurement value among the multiple measurement points illustrated in FIG. 19, and it determines that the reliability is not low for the solar radiation meters corresponding to the other measurement values.

The correction amount calculation unit 18 determines whether a value obtained by dividing the difference between each of the measurement values from the multiple measurement points described above and the average value by the average value is less than or equal to a first percentage, and when the value is less than or equal to the first percentage, the correction amount calculation unit 18 determines that correction is unnecessary, i.e., it sets the correction value to 1. In a case where the measurement value for which the absolute value of the value obtained by dividing the difference between the measurement value and the average value by the average value is larger than the first percentage and less than or equal to a second percentage, the correction amount calculation unit 19 sets a correction coefficient to a first value when the difference is positive (when the measurement value is larger than the average value), and it sets the correction coefficient to a second value when the difference is negative (when the measurement value is smaller than the average value). Furthermore, in a case where the measurement value for which the absolute value of the value obtained by dividing the difference between the measurement value and the average value by the average value is greater than the second percentage and less than or equal to a third percentage, the correction amount calculation unit 18 sets the correction coefficient to a third value when the difference is positive, and it sets the correction coefficient to a fourth value when the difference is negative.

Thus, the first percentage to an n-th percentage (n is an integer greater than or equal to 2) are determined in advance, and for i=1, . . . , and n, a correction coefficient when the absolute value of the value obtained by dividing the difference between the measurement value and the average value by the average value is larger than an (i−1)-th percentage and less than or equal to an i-th percentage is determined in advance. The first percentage<the second percentage< . . . <the n-th percentage is satisfied. The n-th percentage is less than or equal to a percentage corresponding to the normal range described above. For example, n is set to 2; the first percentage and the second percentage are set to 10 and 20%, respectively; the first value and the second value described above are set to 1.1 and 0.9, respectively; and the third value and the fourth value described above are set to 1.2 and 0.8, respectively. The above-described method for determining a correction coefficient is merely an example, and the method for determining a correction coefficient is not limited to the example described above.

When there is a highly accurate solar radiation meter with less deterioration among the solar radiation meters 52, calibration may be performed employing a measurement value from the highly accurate solar radiation meter as a reference. Specifically, for example, a measurement value from a highly accurate solar radiation meter on a fine day is denoted by $L_{ref}$. A measurement value from an i-th solar radiation meter that is present around this highly accurate solar radiation meter, for example, within a range of about 5 km square is denoted by $L_{si}$. At that time, the power generation mount estimation unit 11 calibrates a solar radiation amount of the i-th solar radiation meter by multiplying the coefficient for converting a solar radiation amount of the i-th solar radiation meter into the power generation efficiency by $L_{ref}/L_{si}$.

Furthermore, aged deterioration of each solar radiation meter may be also corrected for. For example, past to latest measurement values from the same solar radiation meter are extracted from the solar radiation amount measurement data, and aged deterioration is corrected for by using the change in these measurement values. In a case of correcting for aged deterioration, when there is a change in a measurement value under the same conditions compared with an initial measurement value at the time of installation, which is assumed to be correct, the change is corrected. For example, the difference between the initial measurement value and the latest measurement value under the same conditions may be added to the latest measurement value. In a case of correcting for aged deterioration, a correction value for correcting for the aged deterioration is obtained before obtaining the correction coefficient based on multiple measurement values within a certain range described above, and the correction value is stored in the storage unit 17 for each solar radiation meter. The correction amount calculation unit 18 calculates the correction coefficient based on the multiple measurement values within a certain range described above for the measurement value after the aged deterioration is corrected for. In a case of correction using the correction data, correction using the correction coefficient is performed after the aged deterioration is corrected for.

FIG. 20 is a diagram illustrating an example of the correction data calculated by the correction amount calculation unit 18. As described above, the correction amount calculation unit 18 determines whether the reliability is low for each of the solar radiation meters, generates a determination result as a reliability flag, and calculates a correction coefficient for each of the solar radiation meters. Then, the correction amount calculation unit 18 stores the reliability flag and the correction coefficient for each of the solar radiation meters in the storage unit 17 as correction data. In the example illustrated in FIG. 20, the correction data includes information for identifying the solar radiation meters, reliability flags, and correction coefficients. In the example illustrated in FIG. 20, the reliability flag being 0 indicates that the reliability is low, and the reliability flag being 1 indicates that the reliability is not low. FIG. 20 is merely an example, and the configuration of the correction data and the values of the reliability flag are not limited to the example in FIG. 20.

Next, estimation of a load/power generation amount for the day and voltage control of the present embodiment will be described. FIG. 21 is a flowchart illustrating an example of a voltage control procedure of the present embodiment. The load/power generation amount calculation unit 14 acquires the latest measurement values, i.e., the latest sensor measurement data and latest measurement values from the solar radiation meters (Step S21). The load/power generation amount calculation unit 14 corrects the measurement values from the solar radiation meters using the correction data (step S22). Specifically, the load/power generation amount calculation unit 14 does not use a measurement value from a solar radiation meter for which reliability is low for the process, and it multiplies a measurement value from a solar radiation meter for which reliability is not low by a correction coefficient.

Figure 22:
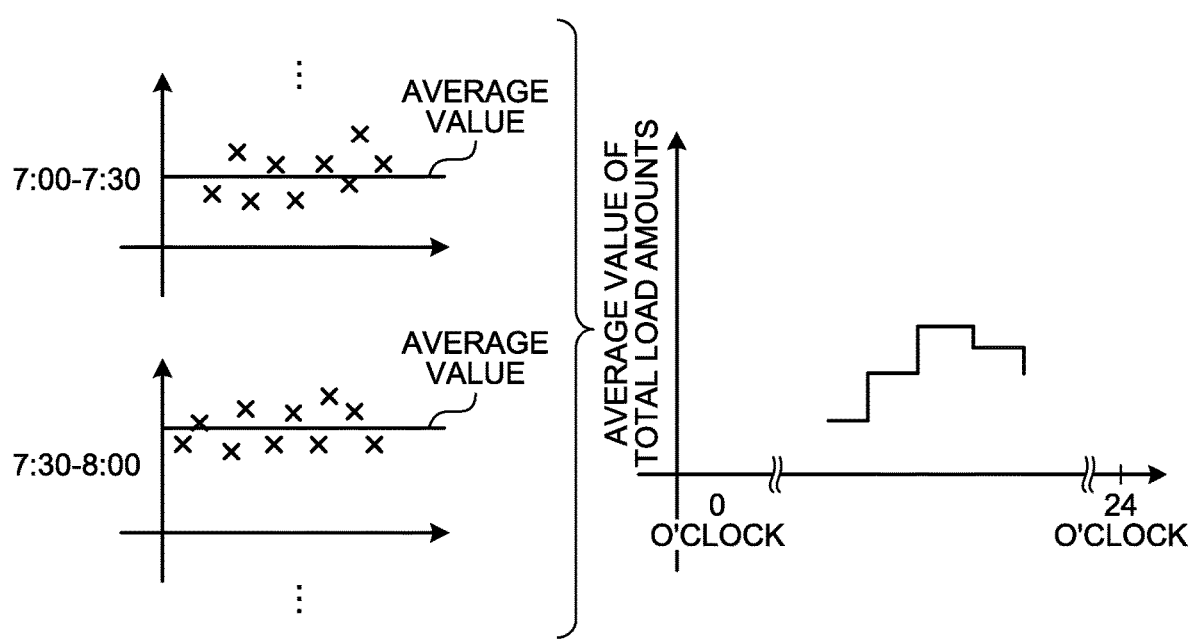
FIG. 22 is a diagram illustrating the concept of a method for calculating a total load amount for the day of the embodiment.

Next, the load/power generation amount calculation unit 14 calculates a present load/power generation amount on the basis of the load data and the latest sensor measurement data (Step 323). Specifically, first, the load/power generation amount calculation unit 14 extracts, from the load data, the total load amounts for the most-recent certain period of time among the total load amounts in the same time period as the present time; obtains an average value of the extracted total load amounts; and sets the obtained average value as the total load amount for the day. FIG. 22 is a diagram illustrating the concept of a method for calculating the total load amount for the day. The left side of FIG. 22 illustrates total load amounts for one month in each time period and an average value thereof. The right side of FIG. 22 illustrates the calculated present total load amount.

Alternatively, the load/power generation amount calculation unit 14 may obtain an average value for each temperature and for each time period on the basis of the total load amounts for the previous one year as follows, and it may employ an average value corresponding to the present temperature and time period as a present total load amount. Temperature ranges are defined in five-degree increments, e.g., 0° C.-5° C., 5° C.-10° C. Then, an average value of the total load amounts for the previous one year is obtained for each temperature range and each time period.

Alternatively, the load/power generation amount calculation unit 14 may define weekdays and holidays as day categories and may use an average value for each day category. Weekdays are Monday through Friday excluding national holidays, and holidays are Saturday, Sunday, and national holidays. The load/power generation amount calculation unit 14 calculates an average value of the total load amounts for each time period for each day category. Then, the load/power generation amount calculation unit 14 employs an average value corresponding to today's day category as the present total load amount.

Alternatively, an average value of the total load amounts for one month in each time period may be obtained for each day category in advance, and the load/power generation amount calculation unit 14 may employ an average value corresponding to today's day category and present time period as the present total load amount. Alternatively, an average value for each temperature range and for each time period may be obtained for each day category in advance, and an average value corresponding to today's day category, present temperature, and present time period may be employed as the present total load amount.

Then, the load/power generation amount calculation unit 14 obtains the present power generation amount distribution on the basis of the present total load amount obtained in Step S23, the latest measurement values from the solar radiation meters after the correction, and the active power among the power flows measured by the high-voltage sensors including the high-voltage sensors 5-1 and 5-2. When the high-voltage sensors are arranged only at delivery points of the distribution lines, the total power generation amount is obtained by subtracting the total load amount from the active power measured by the high-voltage sensors. Then, using the measurement results from the solar radiation meters, the power generation amount of each photovoltaic facility connected to the distribution grid is estimated. That is, the load/power generation amount calculation unit 14 functions as a power generation amount calculation unit that calculates the power generation amount of each of the multiple photovoltaic facilities connected to the distribution line of the high-voltage grid on the basis of the solar radiation amount measured by a solar radiation meter. The power generation amount of each photovoltaic facility is calculated by multiplying the coefficient "α", the measurement value from the solar radiation meter, and the panel capacity together similarly to the way it is done in the above formula (1). When calculating the power generation amount of each photovoltaic facility, in a case where there are multiple solar radiation meters whose distances from the photovoltaic facility are within a certain range, it is desirable to use an average value of measurement values from the multiple solar radiation meters for the calculation.

For a photovoltaic facility around which no solar radiation meter is installed within a certain distance, the power generation amount may be estimated on the basis of a measurement value from a solar radiation meter whose geographical position is closest thereto or an average value of power generation amounts calculated on the basis of the past data may be used. When the sum of the power generation amounts of the photovoltaic facilities obtained by using the measurement results of the solar radiation meters and the total power generation amount obtained from the high-voltage sensors do not coincide with each other, the load/power generation amount calculation unit 14 may change the total load amount accordingly, or it may multiply the power generation amounts of the photovoltaic facilities by a certain value so that the total power generation amount obtained from the high-voltage sensors coincides with the sum of the power generation amounts of the photovoltaic facilities.

Next, the voltage control unit 15 determines the optimum voltage distribution an the basis of the calculation value of the load/power generation amount from the load/power generation amount calculation unit 14 (Step S24). At that time, the optimum voltage distribution is determined as follows. For the distribution of the power generation amounts, the distribution calculated in step S23 is used, and for the distribution of the loads, the loads are assumed to be uniformly distributed. As a method for obtaining the optimum voltage distribution, any method may be used. For example, a power flow calculation is performed to calculate the optimal solution for a voltage at each of the points in the distribution line 9-1 such that each of the points falls within the appropriate voltage range. The optimal solution is a solution that minimizes a predetermined evaluation function. The evaluation function can include the difference between the appropriate voltage range and the voltage at each of the points in the distribution line 9-1. At that time, there is a condition that the difference between the appropriate voltage range and the voltage must be larger than or equal to a predetermined margin amount so that deviation from the appropriate voltage range is prevented even if there is some difference between the actual voltage and an assumed voltage.

The voltage control unit 15 determines the voltage control amount on the basis of the optimum voltage distribution (Step S25). The voltage control unit 15 may control, as the voltage control amount, the optimum control amount that is a control amount for maintaining the voltage calculated as the optimum voltage distribution, or it may determine, as the voltage control amount, information that indicates upper and lower limit values indicating a voltage control range determined on the basis of the optimum control amount. The optimum control amount is a control amount indicated to each voltage control device so as to achieve the optimum voltage distribution. The voltage control unit 15 transmits the determined voltage control amount to the voltage control apparatus 80 via the communication unit 16. When there is a voltage control apparatus controlled by the distribution grid management apparatus 1 in addition to the voltage control apparatus 90, the voltage control unit 15 also determines the control amount for this voltage control apparatus, and it transmits the determined voltage control amount to the voltage control apparatus via the communication unit 16. The voltage control unit 15 performs the above operation for a certain period of time at 10-minute intervals, for example.

Separately from the process illustrated in FIG. 21 performed at certain time intervals, the process illustrated in FIG. 21 may be performed when a change in the measurement values from the solar radiation meters, e.g., the difference from the previous measurement value for each solar radiation meter, is monitored and the monitored difference is greater than or equal to a certain amount. Thus, when a deviation from the appropriate voltage range occurs due to a sudden change in the weather, it is possible to give instructions regarding the voltage control amount and to suppress the deviation from the appropriate voltage range.

In the above description, the load/power generation amount calculation unit 14 obtains the load amount and the power generation amount for the day, but a configuration may be employed in which a load calculation unit that estimates the present load amount and a power generation amount calculation unit that obtains the present power generation amount are separated from each other. Although an example has been described here in which the load amount and the power generation amount for the day are obtained, the load/power generation amount calculation unit 14 may calculate the load amount and the power generation amount on the following day or thereafter in a case where the load amount and the power generation amount are used to develop a power plan, and the like.

In the above example, the distribution grid management apparatus 1 acquires the measurement values from the measurement devices 53 via the communication network 21 and the communication network 2, but the distribution grid management apparatus 1 may acquire the measurement values from the measurement devices 53 via the communication network 21 and the meter data management apparatus 20. A communication network different from the communication network 21 and the communication network 2 may be provided so as to collect the measurement values from the measurement devices 53, and the distribution grid management apparatus 1 may collect the measurement values from the measurement devices 53 via the communication network. The communication network may be a multi-hop network. In all cases, it is satisfactory as long as the measurement devices 53 are capable of transmitting the measurement values at intervals of about one minute, and the distribution grid management apparatus 1 is configured such that it can acquire the measurement values from the measurement devices 53. This means that the distribution grid management apparatus 1 can acquire the measurement values from the measurement devices 53 in near real time. In addition, the power generation amount of each photovoltaic facility can be accurately obtained by using near real time data, and thus the amount of margin to ensure the appropriate voltage range is maintained can be reduced during voltage control.

As described above, the distribution grid system of the present embodiment includes the measurement devices 53 including the solar radiation meters 52, and measurement values from the measurement devices 53 are transmitted via the communication network 21. For this reason, it is possible to collect the measurement values from the measurement devices 53 while at the same time suppressing costs. In addition, it is possible to accurately estimate the power generation amount in the distribution grid by estimating power generation amounts of photovoltaic facilities using the measurement values from the measurement devices 53.

The configurations described in the embodiment above are merely examples of the content of the present invention and can be combined with other known technology and part thereof can be omitted or modified without departing from the gist of the present invention.

REFERENCE SIGNS LIST 1 distribution grid management apparatus; 2, 21 communication network; 3-1 to 3-3 load; 4-1, 4-2 photovoltaic facility; 5-1, 5-2 high-voltage sensor; 6-1, 6-2 circuit breaker; 7 voltage control device; a bus; 9-1, 9-2 distribution line; 11 power generation amount estimation unit; 12 total power generation amount calculation unit; 13 total load calculation unit; 14 load/power generation amount calculation unit; 15 voltage control unit; 16, 25, 105 communication unit; 17, 24, 103 storage unit; 18 correction amount calculation unit; 20 meter data management apparatus; 22 SM management unit; 23 data management unit; 30-1 to 30-3 consumer; 31-1, 31-2, 32, 33 smart meter; 34 watt-hour meter; 51 communicating unit; 52 solar radiation meter; 53-1 to 53-4 measurement device; 60 solar-radiation meter master station apparatus; 71 pole transformer; 80 voltage control apparatus; 101 control unit; 102 input unit; 104 display unit; 106 output unit; 107 system bus; 211 switch unit and measurement unit; 212 slave station.

The invention claimed is:

1. A power generation amount estimation apparatus comprising:
   an acquirer to acquire a solar radiation amount that is a measurement value measured by a solar radiation meter at an interval shorter than a data collection interval that is an interval at which a measurement value from a smart meter that measures an amount of electric power is collected, wherein the solar radiation meter and the smart meter are different measurement instruments that are independent of one another;
   a power generation amount calculator to estimate, on a basis of the solar radiation amount, a power generation amount of each of a plurality of photovoltaic facilities connected to a distribution line of a high-voltage grid, wherein the smart meter is connected to a particular photovoltaic facility of the plurality of photovoltaic facilities and the solar radiation meter is located remotely therefrom, and wherein the measured amount of electric power by the smart meter is independent of the estimated power generation amount estimated based on the solar radiation amount by the solar radiation meter; and
   a voltage controller to cause voltage control on the distribution line based on the estimated power generation amount, and
   wherein the power generation amount calculator estimates an amount of power at the particular photovoltaic facility connected to the smart meter by selecting at least three closest photovoltaic facilities of the plurality of photovoltaic facilities including a photovoltaic facility connected to a different smart meter, and performing the estimation based on measurement values at the at least three closest photovoltaic facilities, a panel capacity of the particular photovoltaic facility, and a panel capacity of the photovoltaic facility connected to the different smart meter.

2. The power generation amount estimation apparatus according to claim 1, wherein the acquirer acquires the solar radiation amount via a smart meter network that is a network used for collecting the measurement value from the smart meter.

3. The power generation amount estimation apparatus according to claim 1, wherein the acquirer acquires the solar radiation amount via a communication network for collecting data from a high-voltage sensor that measures a voltage and a power flow of the distribution line of a high-voltage grid.

4. The power generation amount estimation apparatus according to claim 3, wherein the acquirer acquires the solar radiation amount via a solar-radiation meter master station apparatus that collects the solar radiation amount from the solar radiation meter and transmits the solar radiation amount to the power generation amount estimation apparatus via the communication network.

5. The power generation amount estimation apparatus according to claim 4, wherein the solar-radiation meter master station apparatus is installed on a utility pole on which the high-voltage sensor is installed.

6. The power generation amount estimation apparatus according to claim 1, wherein the measurement value from the solar radiation meter is corrected on a basis of a correction coefficient.

7. The power generation amount estimation apparatus according to claim 1, wherein the solar radiation meter is installed on a utility pole.

8. The power generation amount estimation apparatus according to claim 7, wherein the solar radiation meter is installed on a utility pole on which a pole transformer is installed.

9. The power generation amount estimation apparatus according to claim 1, wherein:
   the voltage controller determines, on a basis of the power generation amount, a control amount of a voltage control device connected to the distribution line.

10. A distribution grid system comprising:
   a distribution line of a high-voltage grid;
   a plurality of photovoltaic facilities connected to the distribution line;
   a solar radiation meter to measure a solar radiation amount; and
   a power generation amount estimation apparatus, wherein the power generation amount estimation apparatus comprises:
      an acquirer to acquire a solar radiation amount that is a measurement value measured by the solar radiation meter at an interval shorter than a data collection interval that is an interval at which a measurement value from a smart meter that measures an amount of electric power is collected, wherein the solar radiation meter and the smart meter are different measurement instruments that are independent of one another, and wherein the smart meter is connected to a particular photovoltaic facility of the plurality of photovoltaic facilities and the solar radiation meter is located remotely therefrom;
      a power generation amount calculator to estimate, on a basis of the solar radiation amount, a power generation amount of each of the photovoltaic facilities connected to the distribution line of a high-voltage grid, wherein the measured amount of electric power by the smart meter is independent of the estimated power generation amount estimated based on the solar radiation amount by the solar radiation meter; and a voltage controller to cause voltage control on the distribution line based on the estimated power generation amount, and wherein the power generation amount calculator estimates an amount of power at the particular photovoltaic facility connected to the smart meter by selecting at least three closest photovoltaic facilities of the plurality of photovoltaic facilities including a photovoltaic facility connected to a different smart meter, and performing the estimation based on measurement values at the at least three closest photovoltaic facilities, a panel capacity of the particular photovoltaic facility, and a panel capacity of the photovoltaic facility connected to the different smart meter.

11. A power generation amount estimation method comprising:

acquiring, by a computing device, a solar radiation amount that is a measurement value measured by a solar radiation meter at an interval shorter than a data collection interval that is an interval at which a measurement value from a smart meter that measures an amount of electric power is collected, wherein the solar radiation meter and the smart meter are different measurement instruments that are independent of one another;

estimating, by the computing device, a power generation amount of each of a plurality of photovoltaic facilities connected to a distribution line of a high-voltage grid on a basis of the solar radiation amount, wherein the smart meter is connected to a particular photovoltaic facility of the plurality of photovoltaic facilities and the solar radiation meter is located remotely therefrom, and wherein the measured amount of electric power by the smart meter is independent of the estimated power generation amount estimated based on the solar radiation amount by the solar radiation meter; and causing voltage control on the distribution line based on the estimated power generation amount, and wherein the estimating includes an estimation of an amount of power at the particular photovoltaic facility connected to the smart meter by selecting at least three closest photovoltaic facilities of the plurality of photovoltaic facilities including a photovoltaic facility connected to a different smart meter, and performing the estimation based on measurement values at the at least three closest photovoltaic facilities, a panel capacity of the particular photovoltaic facility, and a panel capacity of the photovoltaic facility connected to the different smart meter.

* * * * *